(12) United States Patent
Fukita et al.

(10) Patent No.: US 6,574,057 B2
(45) Date of Patent: Jun. 3, 2003

(54) OPTICAL APPARATUS, OPTICAL APPARATUS DRIVING UNIT AND CAMERA SYSTEM

(75) Inventors: Susumu Fukita, Tokyo (JP); Kazumasa Yoshikawa, Utsunomiya (JP); Satoshi Natsume, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 09/824,655

(22) Filed: Apr. 4, 2001

(65) Prior Publication Data

US 2002/0001138 A1 Jan. 3, 2002

(51) Int. Cl.⁷ .......................... G02B 7/02; G02B 15/14; G03B 3/10
(52) U.S. Cl. ....................... 359/824; 359/696; 359/697; 396/133
(58) Field of Search ................................ 359/696, 824, 359/697, 694; 396/133, 137

(56) References Cited

U.S. PATENT DOCUMENTS

| 5,177,524 A | 1/1993 | Tanaka ........................ 354/400 |
| 5,675,441 A | 10/1997 | Imanari ........................ 359/696 |
| 5,731,919 A | 3/1998 | Yamamoto ................... 359/824 |
| 5,978,609 A * | 11/1999 | Aoki ............................ 396/429 |
| 6,025,964 A | 2/2000 | Yamamoto ................... 359/824 |
| 6,285,511 B1 * | 9/2001 | Kanayama et al. ......... 359/696 |

FOREIGN PATENT DOCUMENTS

EP 07-281074 10/1995

OTHER PUBLICATIONS

European Search Report dated Jul. 11, 2001 (Ref.: EP 30125).

* cited by examiner

*Primary Examiner*—Jordan M. Schwartz
*Assistant Examiner*—Tim Thompson
(74) *Attorney, Agent, or Firm*—Fitzpatrick, Cella, Harper & Scinto

(57) ABSTRACT

The invention discloses an optical apparatus comprises an optical member, manual operation means for manually driving the optical member, a driving motor for electrically driving the optical member, determination means for determining either manual drive by the manual operation means or electrical drive by the driving motor, connection means for transmitting drive force by the driving motor to the optical member with a predetermined connection torque, and control means for varying the connection torque of the connection means based on the result of determination by the determination means.

4 Claims, 24 Drawing Sheets

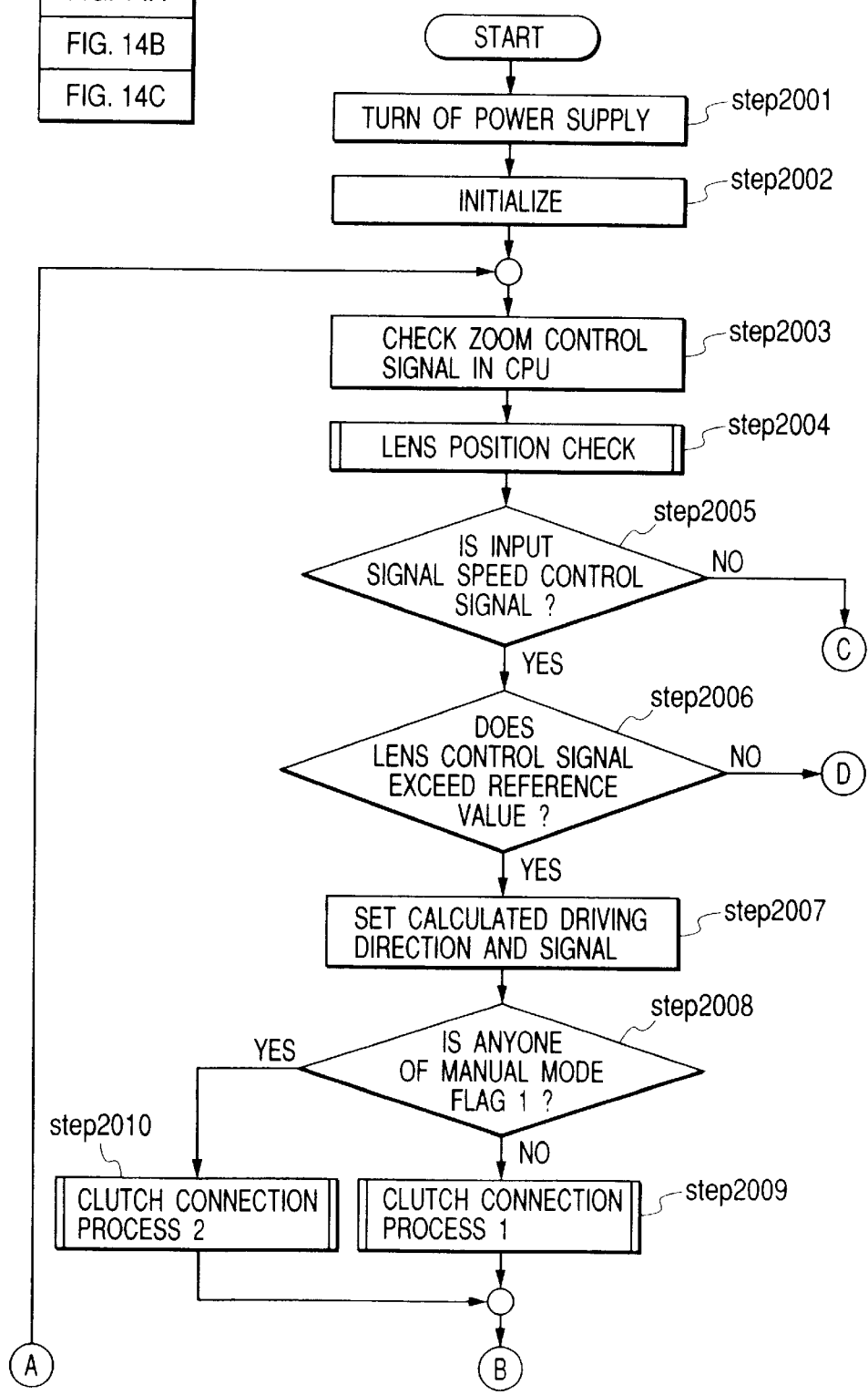

OPTICAL APPARATUS, OPTICAL APPARATUS DRIVING UNIT AND CAMERA SYSTEM

BACKGROUND OF THE INVENTION

1. Field of the Invention

The present invention relates to an optical apparatus and more particularly to an optical apparatus adapted for use in image taking and television image taking, an optical apparatus driving unit and a camera system.

2. Related Background Art

In the following there will be explained, with reference to FIG. 1, a conventional optical apparatus employed for example for television image taking. On the external periphery of a main body 1 of the optical apparatus, there is provided a rotatable operation ring 2, which is either manually driven or electrically driven from a drive unit 4 provided on the main body 1 of the apparatus, for driving optical adjustment means such as a movable lens group (not shown) provided in a casing 3.

Inside the drive unit 4, there are housed a motor and a control circuit for electrically driving the operation ring 2, and the manipulation of an electrical operation switch 5 or the like provided on the external face of the drive unit 4 drives the motor thereby driving the operation ring 2.

In such optical apparatus capable of manual drive and electrical drive for the movable lens group, operation is switched between manual drive and electrical drive generally by the manipulation of a clutch mechanism provided with a switching lever. An example of such a clutch mechanism is shown in FIG. 2. The clutch mechanism is provided, between an operation gear 6 formed on the operation ring 2 and an output gear 8 of a motor 7, with an idle gear 9 slidable in the axial direction of a shaft 10 by the operation of a switch lever (not shown). In the electrical drive, the switch lever is operated to slide the idle gear 9 into a position in mesh with the operation gear 6 and the output gear 8, whereby the driving force of the motor 7 can be transmitted to the operation ring 2 through the idle gear 9. During manual operation, the switch lever is operated to slide the idle gear 9 to a position disengaged from the operation gear 6 and the output gear 8. Thus, conventionally, the operation of operation ring 2 is switched between manual drive and electrical drive by connecting or disconnecting the power transmission path from the motor 7 to the operation ring 2, utilizing a clutch mechanism.

However, in such conventional optical apparatus in which the transmission path of the motor power is connected or disconnected by the operation of the switch lever thereby switching between the manual drive and the electric drive, it is necessary to manipulate the switch lever of the clutch mechanism at each switching between the manual drive and the electrical drive operation, thus involving cumbersome operations and hindering prompt switching between the manual drive and the electrical drive operation.

Also, during an actual image taking operation, in the course of an electrical drive, the operator may manually manipulate the operation ring 2 so as to forcedly stop the electrical drive, or to drive the operation ring in the opposite direction, or to increase or decrease the speed of the electrical drive.

In the above-described clutch mechanism, however, it is difficult to execute a manual operation in the course of the electrical drive.

In recent TV lenses, therefore, switching between the electrical drive mode and the manual drive mode for the zoom lens has been made using a switching mechanism capable of electrical switching (on/off), such as an electromagnetic clutch, thereby avoiding manual switching.

Such function will be explained with reference to FIG. 3. In FIG. 3, there are shown a main body 11 of an image taking lens, a zoom drive ring 11a, an idler gear 16 in mesh with and rotated by the zoom drive ring 11a in the main body of the image taking lens, a zoom driving motor 17, a drive circuit 18 for driving the zoom driving motor 17, a D/A converter 19 for converting a digital drive signal from a CPU 24 (to be explained later) into an analog drive signal for supply to the drive circuit 18, an A/D converter 20 for converting an analog zoom control signal from a zoom control switch 21 (to be explained later) into a digital signal, a zoom control switch 21 for outputting a control signal from the exterior (the CPU 24 controls the present function), a connection on/off circuit 25 for turning on/off the connection of a clutch 26 (to be explained later) according to a connection signal from the CPU 24, and the clutch 26 capable of electrically turning on/off the connection represented by an electromagnetic clutch.

In the case where the zoom control switch 11 is not operated, the CPU 24 detects a manual operation state using a control signal supplied through the A/D converter 20. In such state, a release signal is supplied to the connection on/off circuit 25 in order to release the connection of the clutch 26. In response to such signal, the connection on/off circuit 25 releases the connection of the clutch 26. The release of the connection of the clutch 26 disengages the drive motor 17, whereby the zoom lens can be manually operated using the zoom drive ring 11.

When the zoom control switch 21 is operated, the CPU 24 detects an electric drive operation state using a control signal supplied through the A/D converter 20. In such state, a connection signal for connecting the clutch 25 is supplied to the connection on/off circuit 25, and the clutch 26 is connected in response to the signal.

On the other hand, when the zoom control switch 21 is operated, a control signal corresponding to the operation amount thereof is output. As described in the foregoing, the zoom control signal is supplied through the A/D converter 20 to the CPU 24, which converts the entered zoom control signal into a drive signal so as to output the signal to the D/A converter 19. The D/A converter converts the drive signal into an analog signal, which is used by the drive circuit 18 for driving the driving motor 17. As the clutch 26 is in the connected state, the driving torque of the driving motor 17 is transmitted through the idler gear 16 to the zoom drive ring 11, thereby electrically driving the zoom lens.

In this manner it is possible to switch between the electric mode and the manual mode, without manual switching, by switching the connection and disconnection of the clutch 26 in accordance with the operation of the zoom control switch 21.

However, in an actual image taking operation with the lens apparatus (and the camera), while the zoom lens is electrically driven, the operator may wish to manually operate the zoom drive ring in order to stop the electrical drive, to increase or decrease the driving speed, or even to reverse the driving direction by such manual operation.

In the conventional lens apparatus shown in FIG. 3, as the driving force from the driving motor is transmitted to the zoom lens through the clutch during an electrical drive operation, it is difficult to smoothly achieve a manual operation, such as stopping of the electrical drive, increasing or decreasing of the electrical driving speed, or reversing of the driving direction by manual manipulation.

It is still possible to switch from the electrical mode to the manual mode by detecting a manual operation during an electrical drive operation of the zoom lens. However, after such switching to the manual mode, in the case where the operator releases his hand from the zoom drive ring to restore the electrical drive operation, there are required complex operations, such as returning the zoom control switch to a neutral state and then operating the zoom control switch again, for switching to the electrical mode.

SUMMARY OF THE INVENTION

In consideration of the foregoing, an object of the present invention is to provide an optical apparatus enabling simple and prompt switching of manual drive and electrical drive of an optical member and also enabling a smooth manual operation in the course of the electrical drive.

Another object of the present invention is to provide an optical apparatus and an optical apparatus driving unit enabling a smooth manual operation in case a manual operation is executed in the course of an electrical drive of a zoom lens or the like, and also enabling to restart the electrical drive simply and promptly when the manual operation is released.

The above-mentioned objects can be attained, according to the present invention, by an optical apparatus comprising:
an optical member;
manual operation means for manually driving the optical member;
a driving motor for electrically driving the optical member;
determination means for deetermining the manual drive by the manual drive means or the electrical drive by the driving motor;
connection means for transmitting the drive force by the driving motor to the optical member with a predetermined connection torque; and
control means for varying the connection torque of the connection means according to the result of determination by the determination means.

According to the present invention, there is also provided an optical apparatus comprising:
an optical member;
manual operation means for manually driving the optical member;
a driving motor for electrically driving the optical member;
determination means for determining the manual drive by the manual drive means or the electrical drive by the driving motor;
connection means for transmitting the drive force by the driving motor to the optical member with a predetermined connection torque;
state detection means for detecting the state of the optical apparatus and outputting state detection information; and
control means for varying the connection torque of the connection means according to the result of determination by the determination means;
wherein the control means varies the connection torque also according to the state detection information from the state detection means.

According to the present invention, there is also provided an optical apparatus comprising:
an optical member;
manual operation means for manually driving the optical member;
a driving motor for electrically driving the optical member;
instruction operation means having an operation member and giving a drive instruction to the driving motor in response to the operation of the operation member;
determination means for determining the manual drive by the manual drive means or the electrical drive by the driving motor based on the drive instruction from the instruction operation means;
connection means for transmitting the drive force by the driving motor to the optical member with a predetermined connection torque; and
control means for varying the connection torque of the connection means according to the result of determination by the determination means;
wherein the control means varies the connection torque also according to the drive instruction from the instruction operation means.

According to the present invention, there is also provided an optical apparatus comprising:
an optical member;
manual operation means for manually driving the optical member;
a driving motor for electrically driving the optical member;
determination means for determining the manual drive by the manual drive means or the electrical drive by the driving motor;
connection means for transmitting the drive force by the driving motor to the optical member with a predetermined connection torque; and
control means for varying the connection torque of the connection means according to the result of determination by the determination means;
wherein the control means varies the connection torque, upon detection of an operation of the manual operation means during the electrical drive by the driving motor, according to the operation.

Still other objects of the present invention, and the features thereof, will become fully apparent from the following description of the embodiments.

DESCRIPTION OF THE PREFERRED EMBODIMENTS

Figure 1:
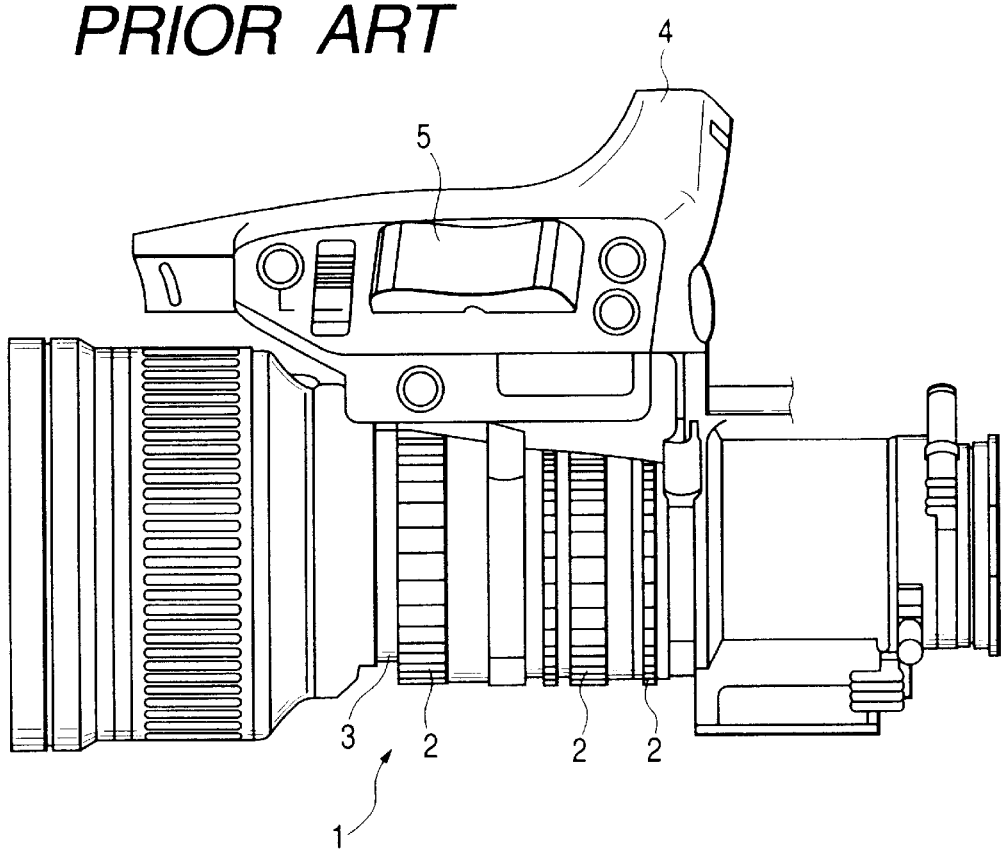
FIG. 1 is a lateral view of a conventional optical apparatus.
Figure 2:
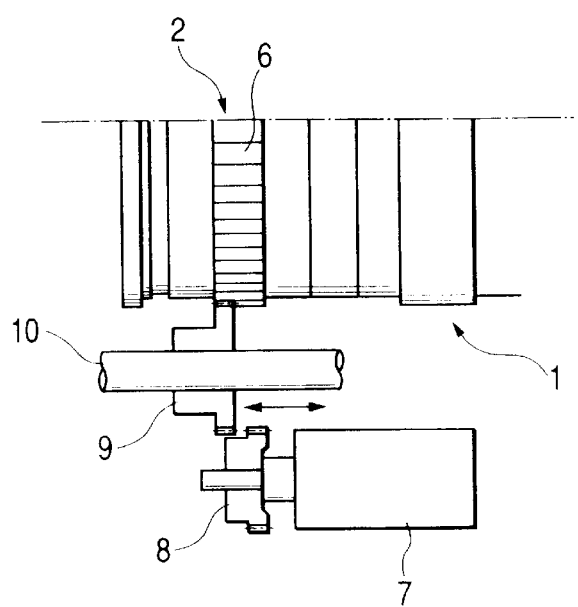
FIG. 2 is a view showing the configuration of a conventional clutch mechanism.
Figure 3:
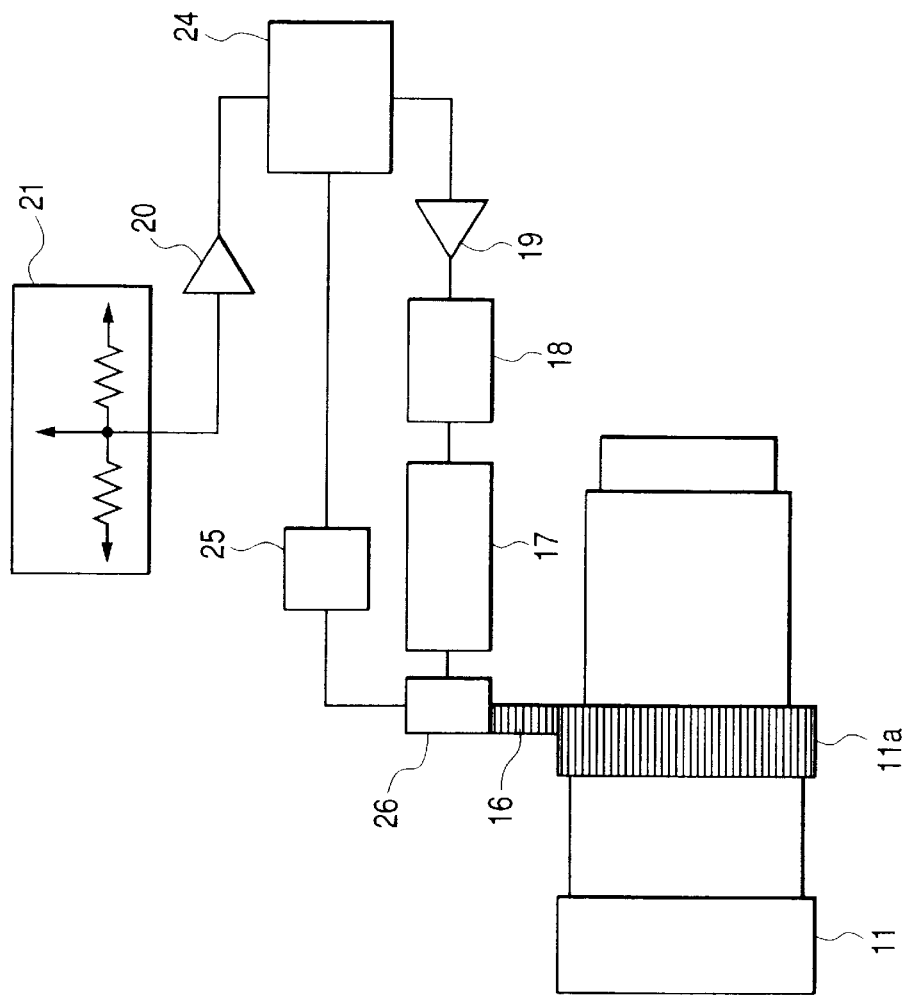
FIG. 3 is a view showing the configuration of a conventional lens apparatus.
Figure 4:
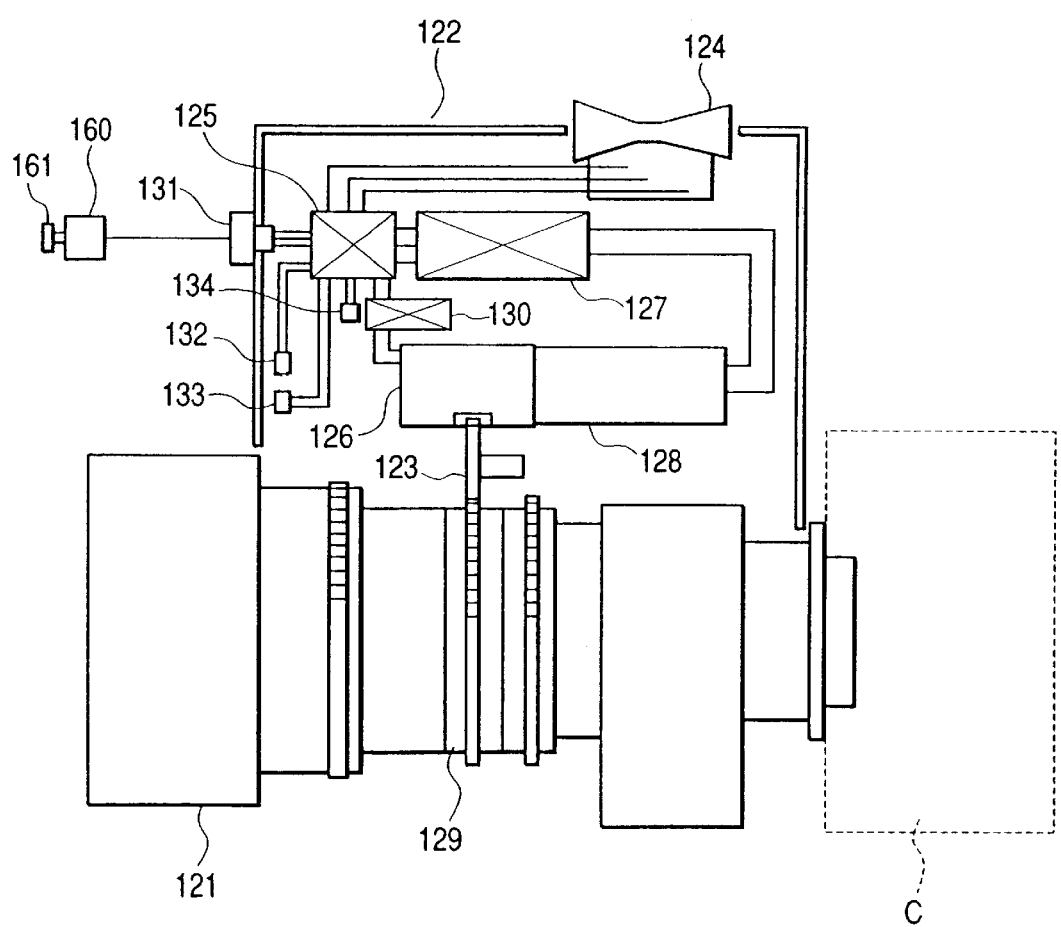
FIG. 4 is a view showing the configuration of a zoom lens constituting a first embodiment of the present invention.

FIG. 4 shows the configuration of a zoom lens, constituting an optical apparatus embodying the present invention. The zoom lens is composed by mounting or connecting a drive unit 122 to a main body 121, and both are connected through an idle gear 123.

The drive unit 122 is provided with an electrical operation member 124 consisting of a seesaw switch which can be operated both in positive and negative directions from a predetermined reference position (neutral point). The output of the electrical operation member 124 is supplied to a CPU 125.

The drive unit 122 is also provided with a temperature sensor 132 for detecting the temperature in the drive unit 122 and a lens posture sensor 133 for detecting the posture of the drive unit 122 (namely posture of the zoom lens), and signals from these sensors 132, 133 are supplied to the CPU 125.

The drive unit 122 is also connectable to a demand 160, constituting an external operation device, through a connector 131, and an instruction signal from an electrical operation member 161 provided on the demand 160 can also be entered into the CPU 125 through the connector 131.

On the other hand, a clutch drive signal from the CPU 125 is supplied through a clutch drive circuit 130 to an electromagnetic clutch 126. Also a motor drive signal from the CPU 125 is supplied through a motor drive circuit 127 to a motor 128.

The main body 121 of the zoom lens is provided with a zoom drive ring 129 which can also be operated manually, and the rotation thereof drive a zoom lens optical system (not shown) in the main body 121 of the zoom lens in optical axis direction. The main body 121 of the zoom lens is mounted on a main body C of a camera, and the camera C and the main body 121 of the zoom lens constitute a camera system.

Figure 5:
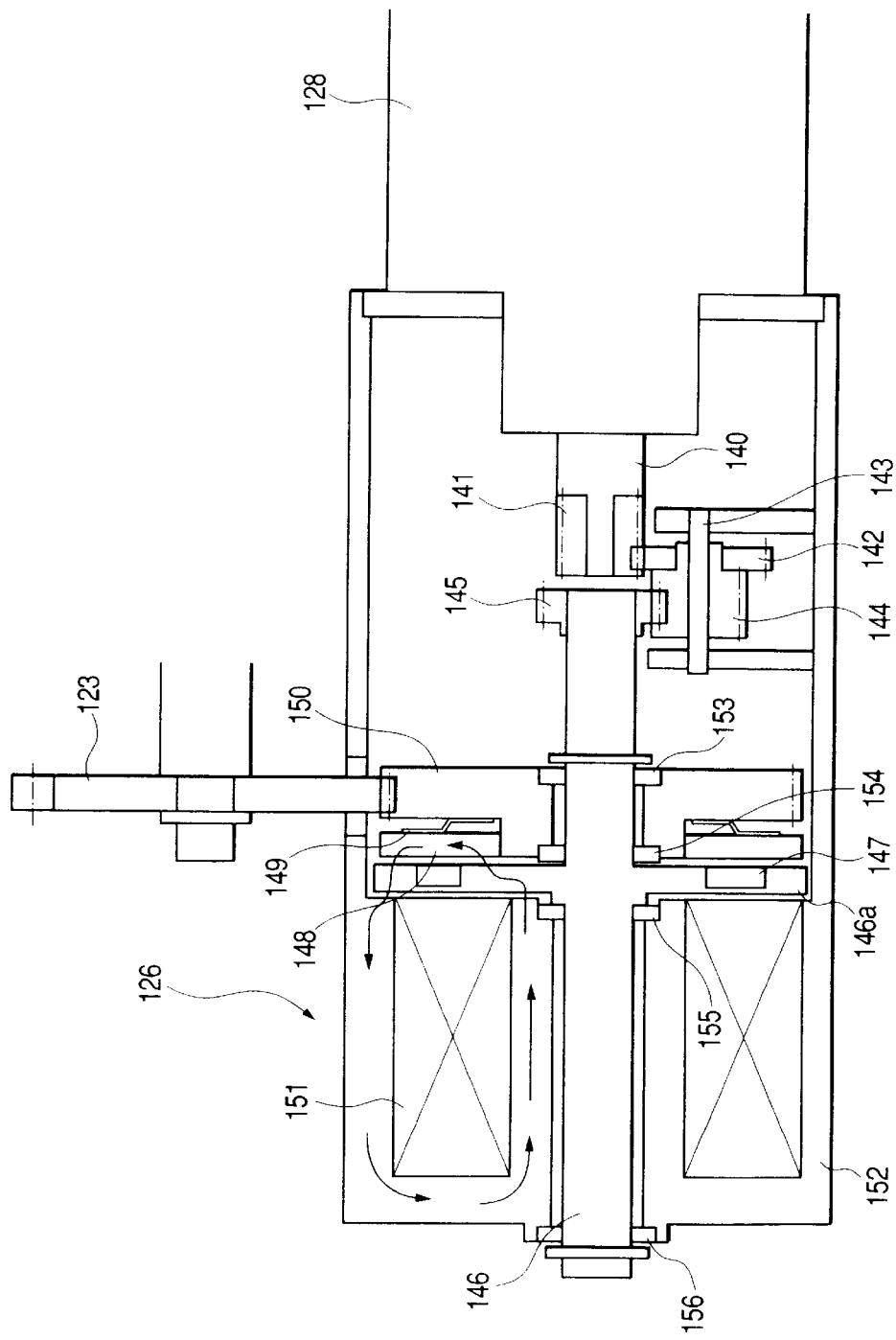
FIG. 5 is a cross-sectional view of an electromagnetic clutch in the above-mentioned zoom lens.

FIG. 5 shows the configuration of the electromagnetic clutch 126. On an output shaft 140 of the motor 128 there is fixed a motor gear 141, meshing with a reducing gear 142, and a gear 144 integral therewith meshes with an input gear 145 of the clutch 126.

A rotary shaft 146 on which the input gear 145 is fixed is supported rotatably by bearings 155, 156 in a fixed tube 152. The rotary shaft 146 is provided therein with a rotary disk 146a, in a part of which there is provided a friction member 147 in an annular shape.

An output gear 150 is rotatably supported by bearings 153, 154 on the rotary shaft 146, and meshes with the idle gear 123. The output gear 150 is also connected to an armature 148 across a plate spring 149. The armature 148 is so constructed as not to be rotatable with respect to the output gear 150 but movable in the axial direction thereof. The armature 148 is formed in a ring shape with a magnetic material such as iron.

When a current is not supplied to an electromagnetic coil 151, the rotary disk 146a and the armature 148 are mutually separated by a small distance, so that the transmission of rotation does not take place between the rotary disk 146a and the armature 148.

Inside the fixed tube 152, there is provided the electromagnetic coil 151 constituting an electromagnet, and, when a current is supplied thereto, the fixed tube 152, the rotary disk 146a and the armature 148 constitute a magnetic circuit whereby the axially movable armature 148 is magnetically attracted to the rotary disk 146a. Thus a frictional force is generated between the armature 148 and the friction member 147 (namely the rotary disk 146a) whereby the rotary disk 146a and the armature 148 rotate integrally.

Figure 6:
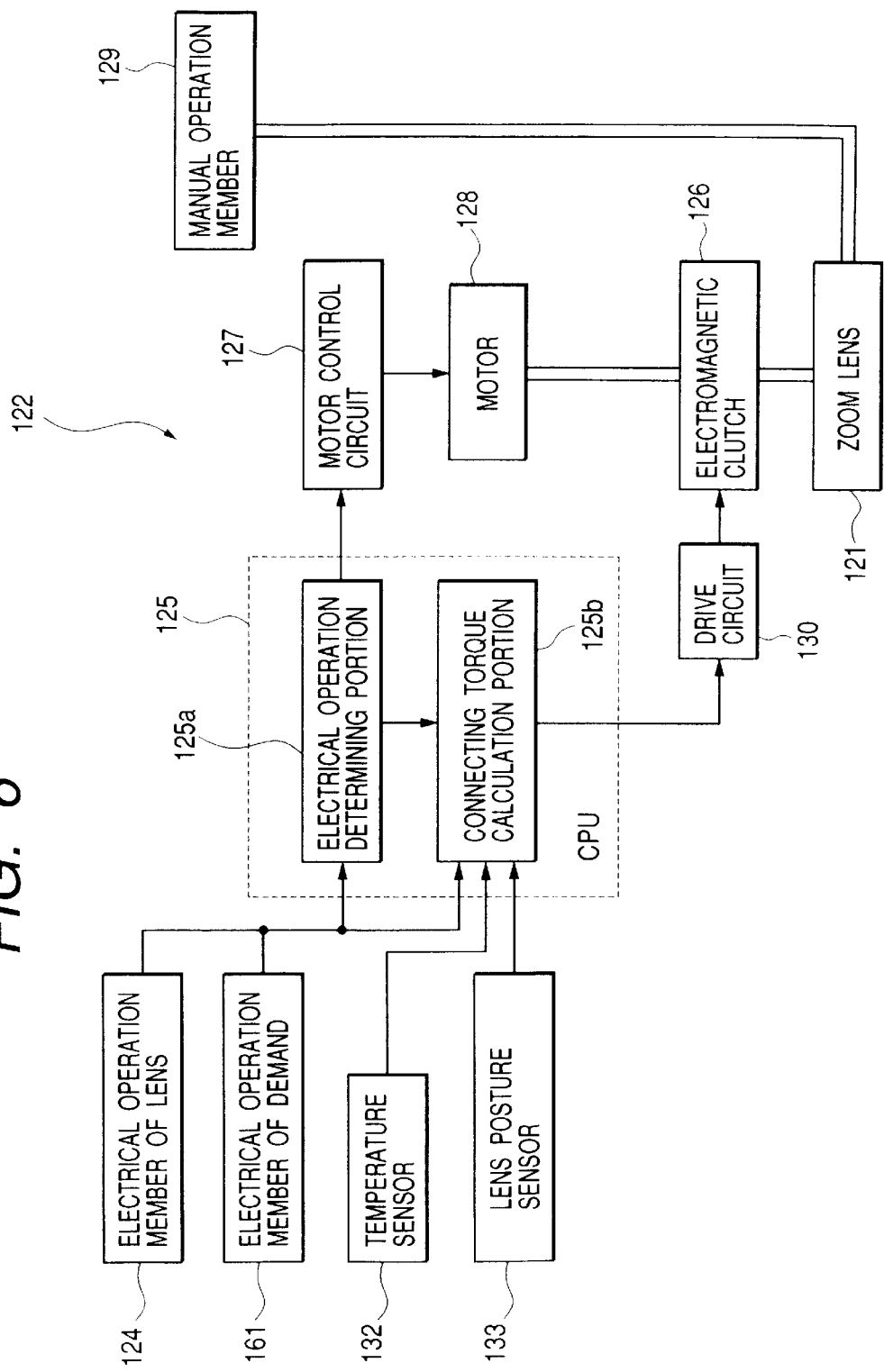
FIG. 6 is a view showing the drive path in the manual drive and the electrical drive in the above-mentioned zoom lens.

FIG. 6 shows the configuration of the drive path of the drive unit 122. In response to the operation of the electrical operation member 124 or the electrical operation member 161 of the demand 160, an instruction signal is outputted with a variable value corresponding to the operation amount and is supplied to an electrical operation determinating portion 125a and a connection torque operation portion 125b of the CPU 125.

The electrical operation determining portion 125a judges the electrical drive or the manual drive according to the output value of the instruction signal from the electrical operation member 124, 161.

Figure 7:
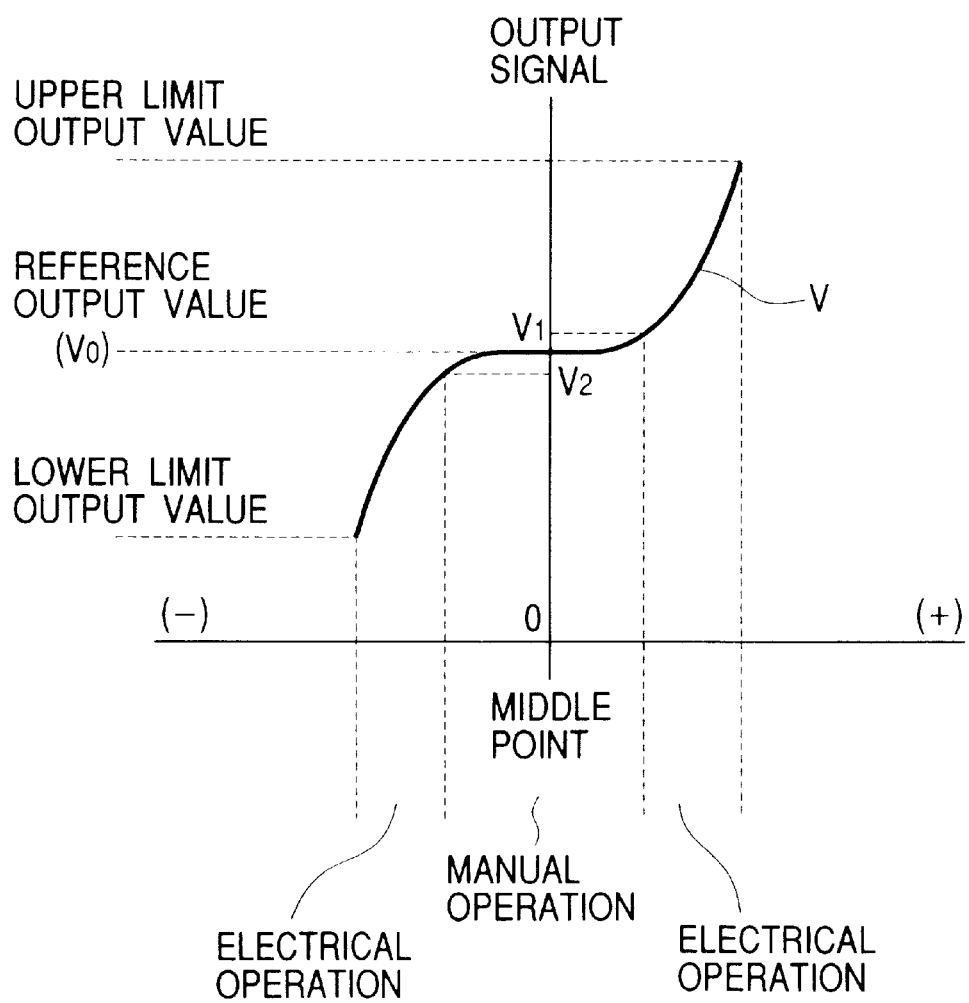
FIG. 7 is a chart showing an output signal of an electrical operation member in the above-mentioned zoom lens.

FIG. 7 shows the change in the output value of the instruction signal from the electrical operation members 124, 161. The instruction signal from the electrical operation members 124, 161 varies as illustrated according to the amount of operation. More specifically, when the electrical operation member 124, 161 is not operated, there is outputted an instruction signal of a reference output value V0. In a central portion of the operation range of the electrical operation member 124, 161, at the plus and minus sides across the neutral operation point thereof, there is a portion where the output value V does not change by a small operation amount. More specifically, there is provided an insensitive range from V2 to V1 across the reference output value V0, in which the motor 128 is not driven by a minimum activation voltage of the motor 128 or by the load of the lens. When the output value V of the instruction signal is within the range from V2 to V1, the electrical operation determining portion 125$a$ judges the manual drive. Also the electrical drive is judged if the output value of the instruction signal is equal to or lower than V2 or equal to or higher than V1.

Also referring to FIG. 6, the instruction signal from the electrical operation members 124, 161 and output signals from the temperature sensor 132 and the lens posture sensor 133 are supplied to the connection torque calculating portion 125$b$ of the CPU 125. The connection torque calculating portion 125$b$ calculates the connection torque (transmission force) required by the clutch 126 and sends a corresponding instruction to the clutch 126 through the drive circuit 130.

The electric operation determining portion 125$a$, upon judging the electric drive, sends a voltage for motor driving to the motor 128 through the motor drive circuit 127, according to the output value of the instruction signal from the electric operation members 124, 161, thereby activating the motor 128.

In this state, the clutch 126 is coupled with the connection torque corresponding to the output from the connection torque calculating portion 125$b$, whereby the rotation of the motor 128 is transmitted to the zoom lens optical system through the zoom drive ring 129.

On the other hand, upon judging the manual drive, the electric operation determining portion 125$a$ terminates the output to the motor 128 and sends an instruction not to activate the clutch 126 to the connection torque calculating portion 125$b$, whereby the clutch 126 is disconnected to separate the zoom lens 121 from the motor 128 and to enable manual operation of the zoom drive ring 129.

Figure 10:
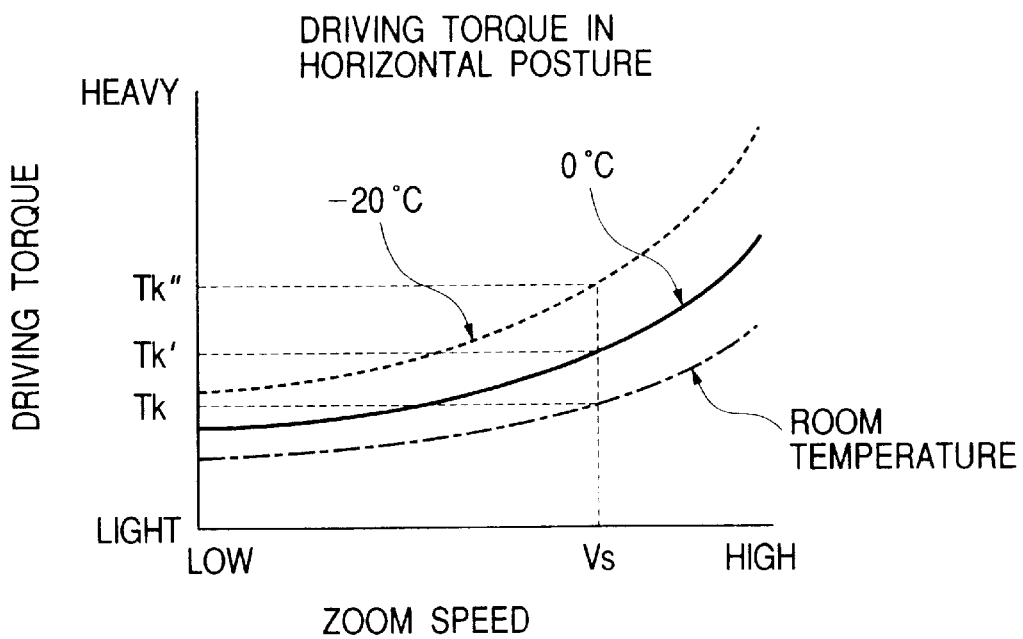
FIG. 10 is a chart showing the relationship between the necessary drive torque and the zoom speed.

FIG. 10 shows the relationship between the zoom speed and the drive torque necessarily for driving the lens at different temperatures in the unit. At each temperature, the drive torque is low at a low zoom speed but increases as the zoom speed increases. Also at a same zoom speed, the drive torque increases at a lower temperature by the influence for example of grease used in the lens. For example, for a zoom speed Vs, the drive torque Tk at the normal temperature increases to Tk' (Tk'>Tk) at 0° C. and further increases to Tk" at −20° C.

Figure 8:
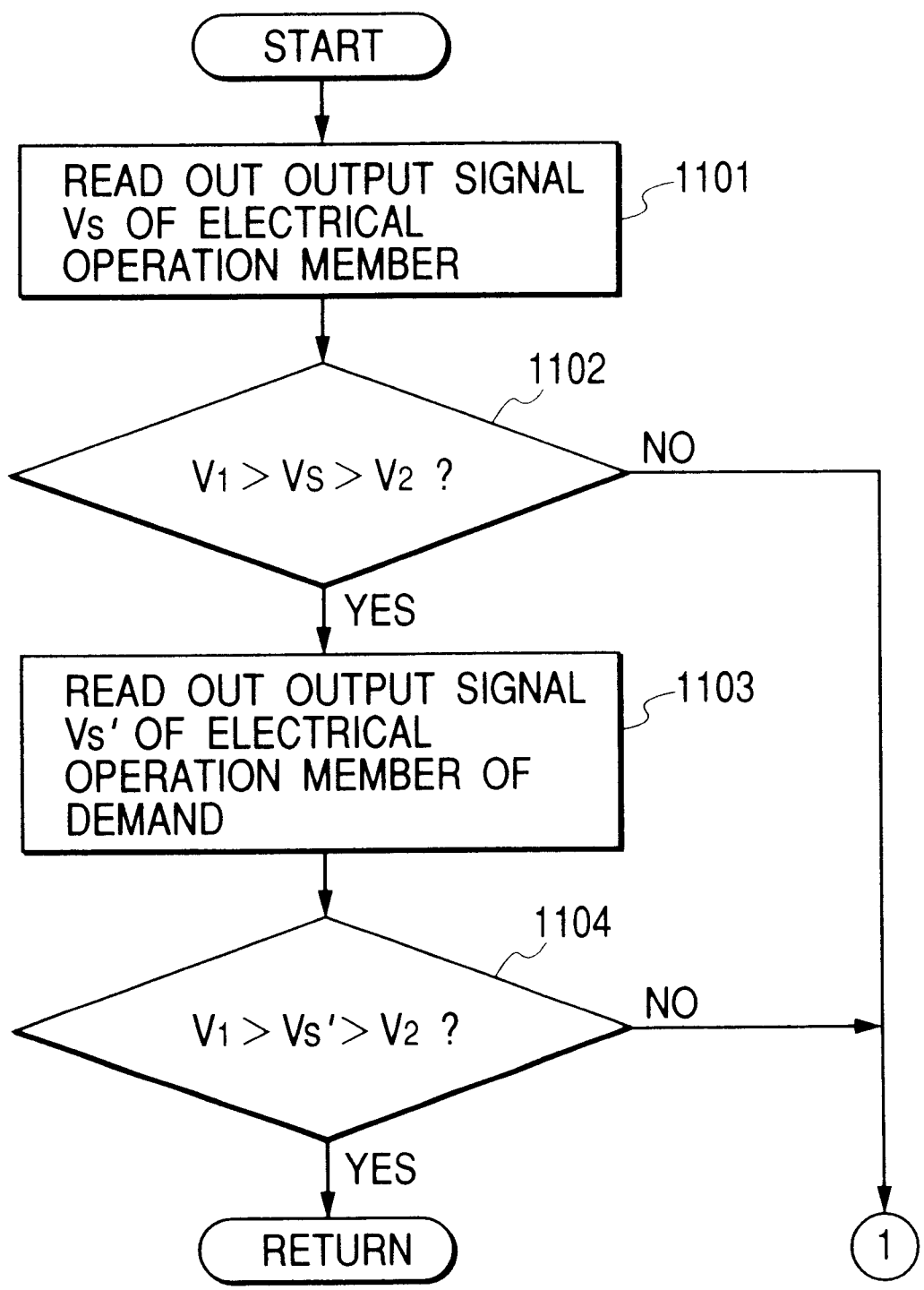
FIG. 8 is a flow chart showing the function of an electrical operation determining portion in the above-mentioned zoom lens.

In the following there will be explained the function of the CCPU 125 with reference to a flow chart shown in FIG. 8, when none of the electrical operation members 124, 161 is operated (or operated in the insensitive range) in such configuration.

At step 1101, the output value Vs of the instruction signal from the electrical operation member 124 is fetched into the electrical operation determining portion 125$a$.

Then at step 1102, it is judged whether the instruction signal Vs satisfies a relation V1>Vs>V2. As this relation stands in this situation as explained in the foregoing in relation to FIG. 7, the sequence proceeds to a step 1103.

At step 1103, the output value Vs' of the instruction signal from the electrical operation member 161 of the demand 160 is fetched into the electrical operation determining portion 125$a$.

At step 1104, it is judged whether the instruction signal Vs' satisfies a relation V1>Vs'>V2. Since this relation stands in this situation, there is judged the manual drive of the zoom lens optical system. In case the manual drive is identified, no output signal is supplied to the motor drive circuit 127, so that the motor 128 is not activated. Also in case the manual drive is identified, the connection torque calculating portion 125$b$ sets the connection torque at "0" (disconnected). Therefore, the clutch 126 is not given any voltage so that the clutch remains in the off state.

More specifically, referring to FIG. 5, since the electromagnetic coil 151 is not given any current, the armature 148 is not attracted by the rotary disk 146$a$ and remains separated therefrom by the force of the spring 149. When the zoom drive ring 129 is manually rotated in this state, the idle gear meshing therewith rotates and the output gear 150 and the armature 148 rotate therewith. The output gear 150 and the armature 148, being rotatably supported by the bearings, can freely rotate without almost any load. Therefore the zoom drive ring 129 can be manually operated almost without any deterioration in the feeling of the manual operation.

Figure 9:
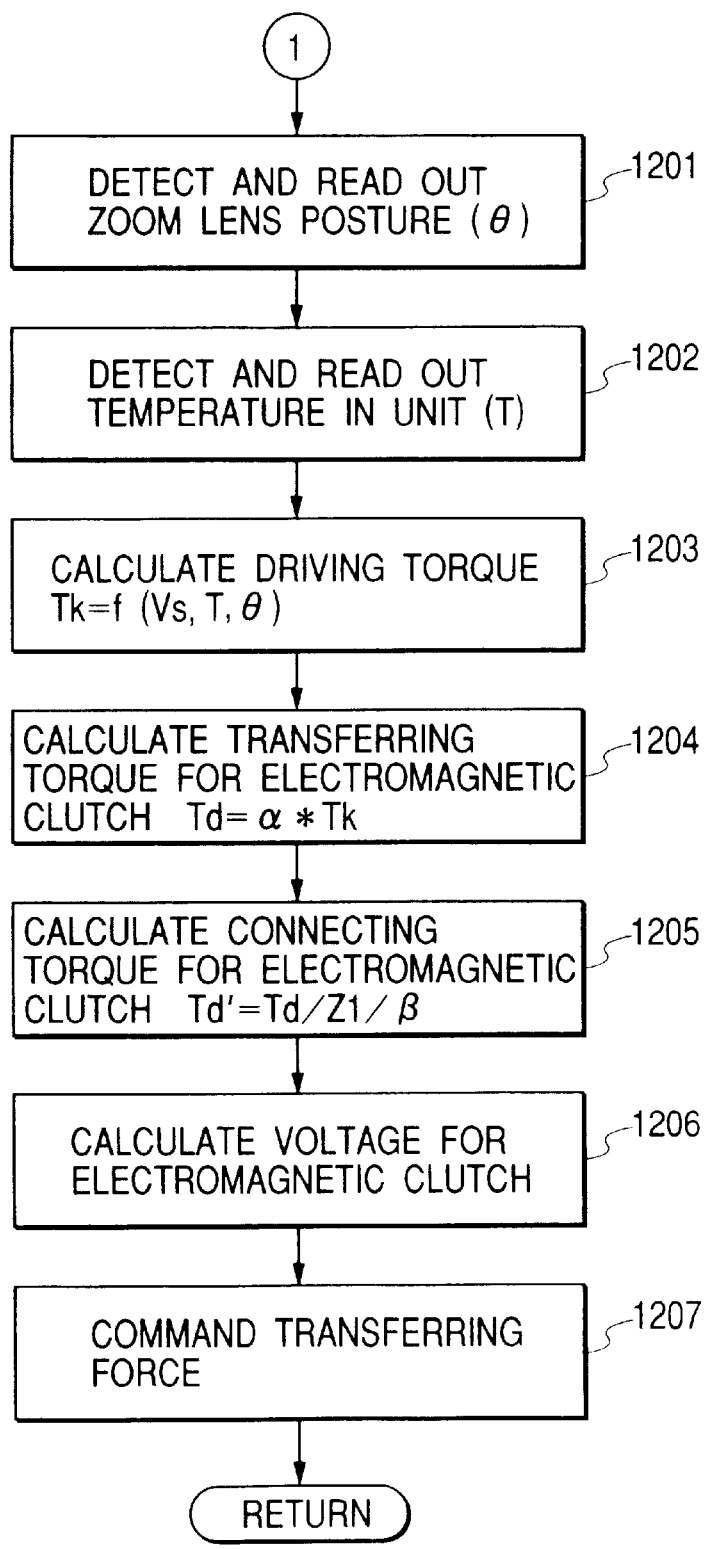
FIG. 9 is a flow chart showing the function of the above-mentioned zoom lens in the electrical drive.

In the following there will be explained, with reference to flow charts shown in FIGS. 8 and 9, the function when the electrical operation member 124 of the lens or the electrical operation member 161 of the demand 160 is operated. In the following there will only be explained a case of operation of the electrical operation member 124, as the operation is same for the electrical operation member 124 or the electrical operation member 161 of the demand 160. Also in FIGS. 8 and 9, a circled numeral 1 indicates that the flow charts are mutually connected at this point.

At first, at step 1101, the output value Vs of the instruction signal from the electrical operation member 124 is fetched. If the electrical operation member 124 is operated (assumedly in the+side in FIG. 7) in this state, the output value Vs of the instruction signal of the electrical operation member 124 becomes larger than V1, so that the relation V1>Vs>V2 does not stand in the step 1102. Therefore the electrical operation determining portion 125$a$ identifies the electrical drive, whereby the sequence proceeds to a step 1201 in FIG. 9.

At step 1201, the posture (θ) of the zoom lens is detected based on the output from the lens posture sensor 133 and fetches the value of the output is fetched, in order to judge whether the lens posture is horizontal, upward or downward.

At step 1202, the current temperature (T) in the unit is similary detected and fetched based on the output from the temperature sensor 132.

At step 1203, the drive torque required for driving the zoom lens is determined based on the lens posture, temperature and already fetched output value Vs of the instruction signal from the electrical operation member 124.

For determining the drive torque, the drive torque of the lens is measured in different states in advance as shown in FIG. 10 and the obtained values are stored as table data in a memory 134 shown in FIG. 4. Otherwise the measured drive torque is represented by an approximation equation and the coefficients thereof are stored in the memory 134. Based on such stored data, the required drive torque are determined from the table data or from the approximation equation, corresponding to the current temperature, the lens posture and the output of the electrical operation member 124.

For example, a curve representing the relationship between the zoom speed and the drive torque is memorized for each temperature and each lens posture, and the required drive torque Tk corresponding to the zoom speed (output value of instruction signal) Vs is determined in accordance with the current temperature and lens posture.

Figure 11:
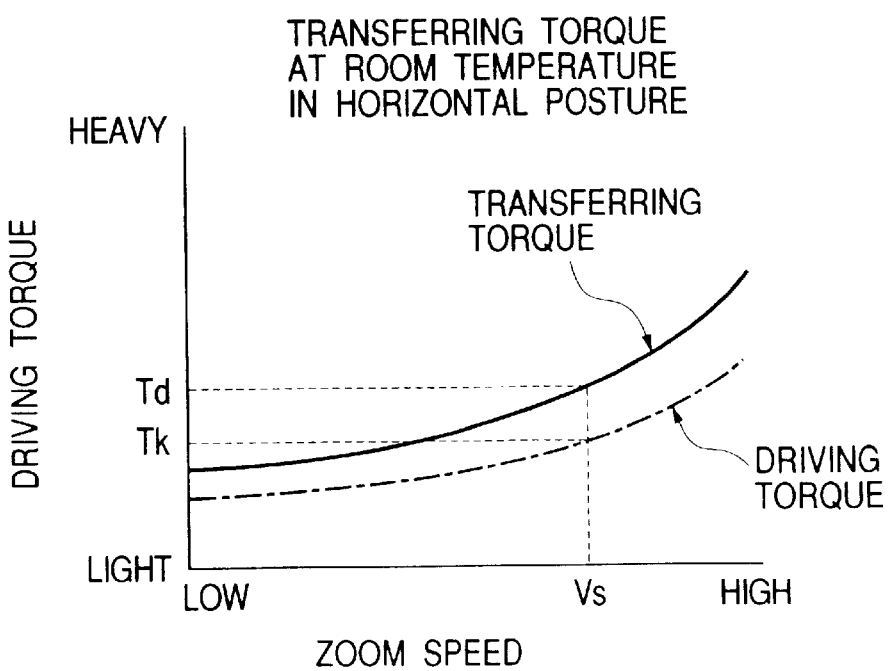
FIG. 11 is a chart showing the relationship between the necessary transmission torque and the zoom speed.

At step 1204, the necessary transmission torque Td of the electromagnetic clutch 126 corresponding to the necessary drive torque Tk is calculated as shown in FIG. 11. More specifically, the necessary transmission torque Td is obtained by multiplying the necessary drive torque Tk with a marginal safety coefficient a (for example 1.2 or 1.4).

At step 1205, a connection torque Td' of the electromagnetic clutch 126 required for generating the necessary transmission torque Td is determined. For a reducing ratio Z1 from the output gear 150 in the electromagnetic clutch 126 to the zoom ring 129, there is given:

$$Td'=Td/Z1/\beta$$

wherein $\beta$ is the transmission efficiency from the output gear 150 to the zoom ring 129.

At step 1206, an electromagnetic clutch voltage Vd required for generating the connection torque Td' is determined and sent to the electromagnetic clutch 126.

In response to the supply of the voltage Vd to the electromagnetic clutch 126, a current is generated in the coil 151 shown in FIG. 5, thereby generating a magnetic field as indicated by an arrow in the fixed tube 152. The generated magnetic field passes the interior of the fixed tube 152, the central portion of the rotary disk 146a provided with a small gap thereto, and then the armature 148, and returns to the external portion of the rotary disk 146a and the external periphery of the fixed tube 152, thereby constituting a magnetic circuit as indicated by arrows in the drawings.

As an annular non-magnetic friction member 147 is provided between the central portion and the external portion of the rotary disk 146a, the magnetic field passing through the central portion thereof does not immediately move to the external portion but is directed toward the armature 148. Therefore, the armature 148 is attracted to the rotary disk 146a by an attracting force N against the biasing force of the plate spring 149. As a result, the rotary disk 146a and the armature 148 are connected with a transmission force (connection torque) Td':

$$Td'=\mu*N*r$$

wherein $\mu$ is the friction coefficient between the rotary disk 146a and the armature 148 and r is the average radius of the contacting portion between the rotary disk 146a and the armature 148.

On the other hand, in case the electrical drive is identified, the instruction signal from the electrical operation member 124 is outputted from the electrical operation determining portion 125a to the motor drive circuit 127, whereby the motor 128 is rotated according to the output value of such instruction signal.

Thus, referring to FIG. 5, the rotation of the motor 128 rotating with a speed corresponding to the output value of the instruction signal is transmitted through the reducing gear train 142, 144 to the input gear 145 thereby rotating the rotary disk 146a through the input shaft 146. Therefore rotated also is the armature 148 attracted and connected to the rotary disk 146a by the electromagnetic force as explained in the foregoing, whereby the zoom drive ring 129 is rotated through the plate spring 149, output gear 150 and idle gear 123. In this manner the zoom drive ring 129 or the zoom lens optical system is electrically driven with a speed corresponding to the operation amount (value of the instruction signal) of the electrical operation member 124.

In the following there will be explained the function in a case in which the zoom drive ring 129 is manually operated in the course of the operation of the electrical operation member 124 (by an example where the zoom drive ring 129 is rotated in a direction opposite to that of the electrical drive).

The function is same as explained in the foregoing, up to a point where the zoom ring is electrically driven by the operation of the electrical operation member 124.

In case, while the zoom operation ring 129 is electrically driven, the zoom operation ring 129 is manually rotated in the opposite direction against the drive by the motor 128, the electrical operation determining portion 125a judges the state as an ordinary electrical drive, thereby rotating the motor 128 and connecting the electromagnetic clutch 126 with the necessary connection torque, since there is not provided a sensor for detecting such manual operation of the zoom operation ring 129.

If the operator tries to manually rotate the zoom drive ring 129 forcedly in a direction opposite to the electrical driving direction with a torque Tsy larger than the drive torque Td, as the zoom drive ring 129 is linked in the rotating direction with the armature 148 through the idle gear 123, output gear 150 and plate spring 149, the armature 148 tends to rotate in the opposite direction with a large manual operation torque Tsy':

$$Tsy'=Tsy/Z1/\beta.$$

On the other hand, as the rotary disk 146a is connected to the motor 128 through the rotary shaft 146 and the gear train 141, 412 and is rotated by the motor 128, the rotary disk 146a and the armature 148 tend to rotate in mutually opposite directions at the connecting portion of the electromagnetic clutch 126.

Now let us consider the relationship of the torques. The torque Tm of the rotary disk 146a rotated by the maximum torque that can be generated by the motor 128 generally satisfies a relation:

$$Tm>Td'$$

and, since Td'>Tk' as explained in the foregoing, there stands a relation:

$$Tm>Td'>Tk'.$$

Also, since:

$$Tsy'>Td'$$

the rotary disk 146a and the armature 148 eventually rotate in the mutually opposite directions with slipping in the connecting portion of the electromagnetic clutch 126.

Thus, the manual operation of the zoom drive ring 129 is rendered possible in the electrically driven state, without returning of the electrical operation member 124 to the neutral point. The manual operation torque required in this state becomes somewhat larger than the connection torque Td'. The connection torque Td' is determined with a certain margin on the necessary drive torque Td' and is therefore not so large, so that the torque required for the manual operation does not also become large.

Therefore, there can be obtained an agreeable feeling of operation even in case the electromagnetic clutch 126 is connected with a connection torque larger than the torque Tm of the rotary disk 146a under the maximum torque of the motor 128.

Also even in case the zoom drive ring 129 or the idle gear 123 suddenly becomes immobile by a certain trouble in the electrical drive state, the armature 148 and the rotary disk 146a cause a slippage therebetween to prevent the motor 128 or the reducing gear train thereof from excessive load.

In the foregoing there has been explained a case where the zoom drive ring 129 is manually and forcedly rotated in the direction opposite to the electrical driving direction, but the function is similar also in case the zoom drive ring 129 is manually operated, in the course of the electrical drive, so as to forcedly stop or brake the rotation of the zoom drive ring 129, or is rotated in a direction same as the electrical driving direction to manually accelerate the rotation of the zoom drive ring 129.

Also in the foregoing embodiment, there has been explained a case where, when the electrical operation determining portion 125a identifies the manual drive, the connection torque calculating portion 125b sets the connection torque of the electromagnetic clutch 126 at "0" whereby the electromagnetic clutch 126 is set in the disconnected state, but it is also possible to provide the zoom drive ring 129 through the electromagnetic clutch 129 with a certain small torque in case the manual drive is identified.

In such case, the electromagnetic clutch 126 is connected with a connection torque Td" (0≦Td"<Tk'<Td') in case the electrical operation determining portion 125a identifies the manual drive. The manual rotation of the zoom drive ring 129 in such state causes the rotation of the armature 148 through the idle gear 123 and the output gear 150, and, since the armature 148 is connected to the rotary disk 146a with the connection torque Td", the armature 148 rotates with a slippage with respect to the rotary disk 146a, thereby increasing the torque required for the manual operation of the zoom drive ring 129 by an amount proportional to the connection torque Td". Thus a certain load can be given to the manual operation of the zoom drive ring 129, and there can be given a satisfactory feeding of manual operation to the user who prefers a certain load in the manual operation.

Also by rendering variable the connection torque Td" of the electromagnetic clutch 126, the load of the zoom drive ring 129 in the manual operation can be variably set according to the taste of various users.

The foregoing embodiment has been explained by a zoom lens which is used by mounting the drive unit 122 to the main body 121 of the zoom lens, but the present invention is likewise applicable to a zoom lens integrally containing a main body portion of the zoom lens and a drive system portion within an outer casing (however a member corresponding to the zoom drive ring 129 being manually operable from the exterior) and mounted on a camera.

Also in the foregoing embodiment, the electrical operation member of the lens or the demand has been explained as the instruction means, but the instruction means in the present invention is not limited to such example. For example, in an optical apparatus with auto zooming function or auto focusing (AF) function, the present invention may be applied to instruction means such as a signal generating circuit for generating and outputting an instruction signal for electrical drive by such automatic optical adjusting functions. Thus the present invention is effective also in case of a manual operation in the course of electrical drive of a focusing lens system under the auto focusing function. In such case, the clutch may be connected or disconnected simply according to the entry or absence of an instruction signal, instead of the entry or absence of the instruction signal exceeding a predetermined range as in the foregoing embodiment.

In the following there will be explained a second embodiment of the present invention.

Figure 12:
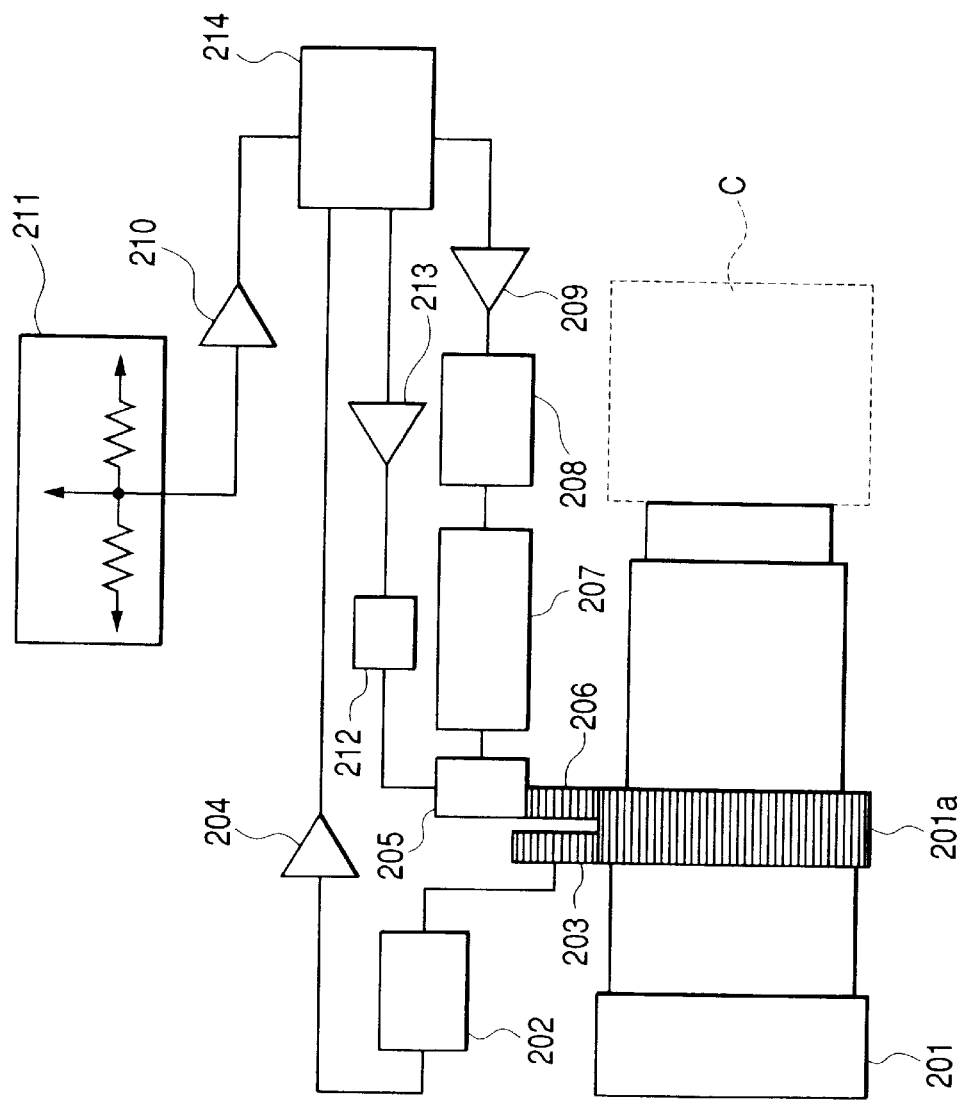
FIG. 12 is a view showing the configuration of a lens apparatus constituting a first embodiment of the present invention.
Figure 13:
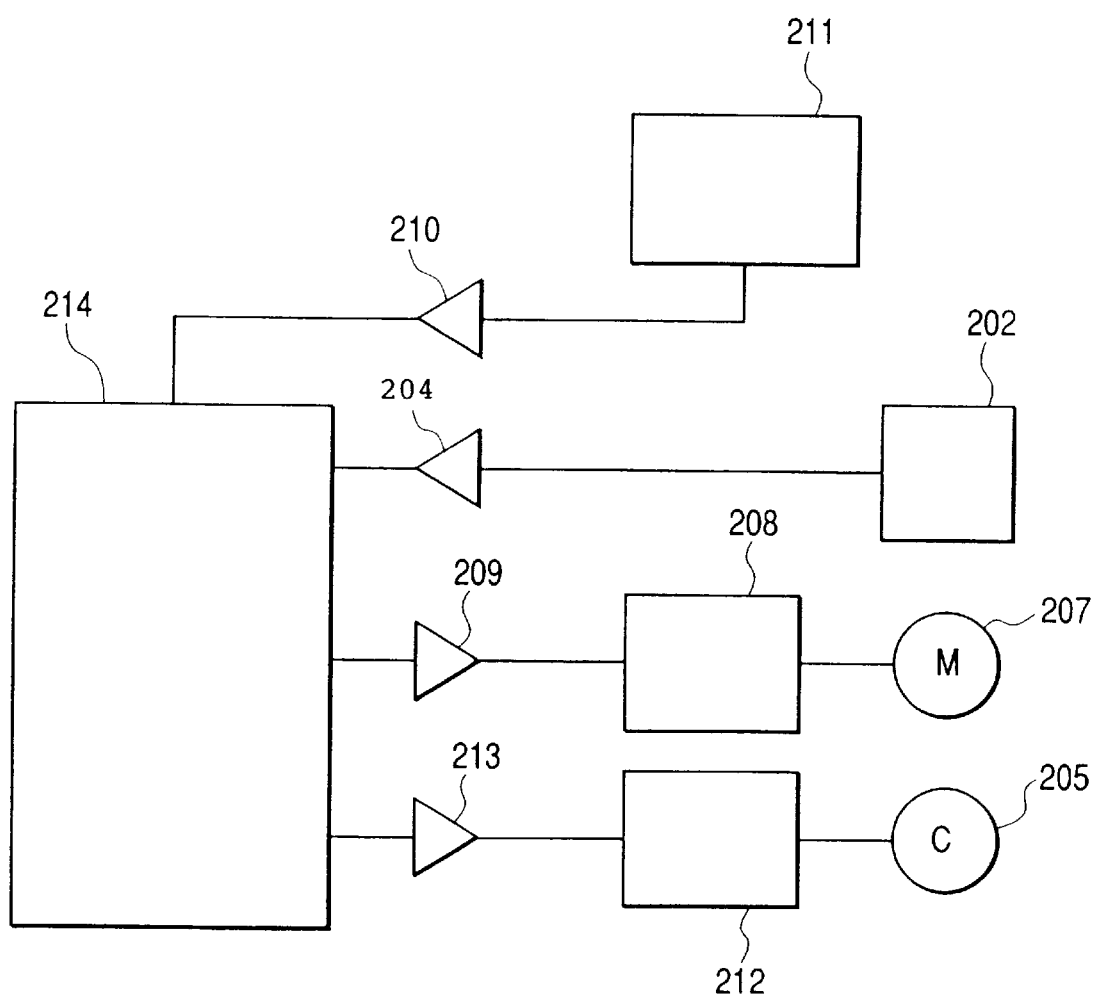
FIG. 13 is a block diagram showing the configuration of a control system of the above-mentioned lens apparatus.

FIGS. 12 and 13 show the configuration of a lens apparatus constituting a second embodiment of the optical apparatus of the present invention, wherein shown are a main body 201 of an image taking lens, and a zoom drive ring 201a provided on the main body 201 for driving a zoom lens optical system (not shown) therein.

An idler gear 203 meshing with the zoom drive ring 201a is mounted on a rotary shaft of a zoom position detector 202. When the zoom drive ring 201a is rotated in relation to the movement of the zoom lens optical system between the wide angle end and the telephoto end, the rotation is transmitted through the idler gear 203 to the zoom position detector 202, which in response outputs a signal corresponding to the position of the zoom lens optical system between the wide angle end and the telephoto end. An A/D converter 204 is provided for convereting an analog zoom position signal, outputted from the zoom position detector 202, into a digital signal.

There are also provided an idler gear 206 meshing with the zoom drive ring 201a, and an electromagnetic clutch 205 of which an output portion (constituting a component at the optical adjustment means side) meshes with the idler gear 206.

The clutch 205 can electrically turn on/off the connection between a driving motor 207 and the idler gear 206 (zoom drive ring 201a), and can variably set the connection torque, namely the maximum drive torque transmittable to the zoom drive ring 201a through the idler gear 206 for a given drive torque entered from the driving motor 207 and having the same amount torque, according to an entered connection control signal (to be explained later).

A zoom control switch 211 is operated by an operator instructing the drive of the zoom lens optical system, and outputs a zoom control signal (instruction signal) proportional to the operation amount, and an A/D converter 210 converts the analog zoom control signal, outputted from the zoom control switch 211, into a digital signal.

There are also provided a CPU 214 for controlling the electrical drive of the zoom lens optical system, the connection and disconnection of the clutch 205 and the switching thereof, according to the zoom control signal from the zoom control switch 211, and a D/A converter 209 for converting the digital drive signal, outputted from the CPU 214 according to the zoom contrl signal, into an analog drive signal for supply to a drive circuit 208 driving the driving motor 207.

There are further provided a connection control circuit 212 for turning on/off the connection of the clutch 205 and varying the connection torque thereof according to the connection control signal entered from the CPU 214 through the D/A converteer 213, and a D/A converter 213 for converting the digital connection control signal outputted from the CPU 214 into an analog signal for supply to the connection control circuit 212.

In the lens apparatus of the above-described configuration, in response to the operation of the zoom control switch 211, the connection of the clutch 205 is turned on to transmit the driving force of the driving motor 207 to the zoom drive ring 201a through the clutch 205, whereby the zoom drive ring 201a is rotated to electrically drive the zoom lens optical system in the optical axial direction. Thus, by the manual operation of the operator on the zoom drive ring 201a in the course of the electrical drive to forcedly stop, accelerate, decelerate or reverse the rotation of the zoom drive ring 201a, the zoom lens optical system is stopped, accelerated, decelerated or reversed in the optical axial direction while the clutch 205 remains in the connected state (in the electrically driven state).

Also in case the clutch 205 is disconnected by the absence of the operation of the zoom control switch 211, the zoom lens optical system can be manually driven in the optical axial direction by the manual rotation of the zoom drive ring 201a by the manual portion of the operator.

In the present embodiment, the above-described components other than the main body 201 of the lens and the zoom drive ring 201a are constructed as a unit that can be detachably mounted or connected to the main body 201 of the lens. A camera system is constituted by mounting the main body 201 of the image taking lens to a camera C. It is however possible also to integrate all the components described in the foregoing in a single casing to constitute an integral lens apparatus detachably mountable to the camera C.

Figure 14B:
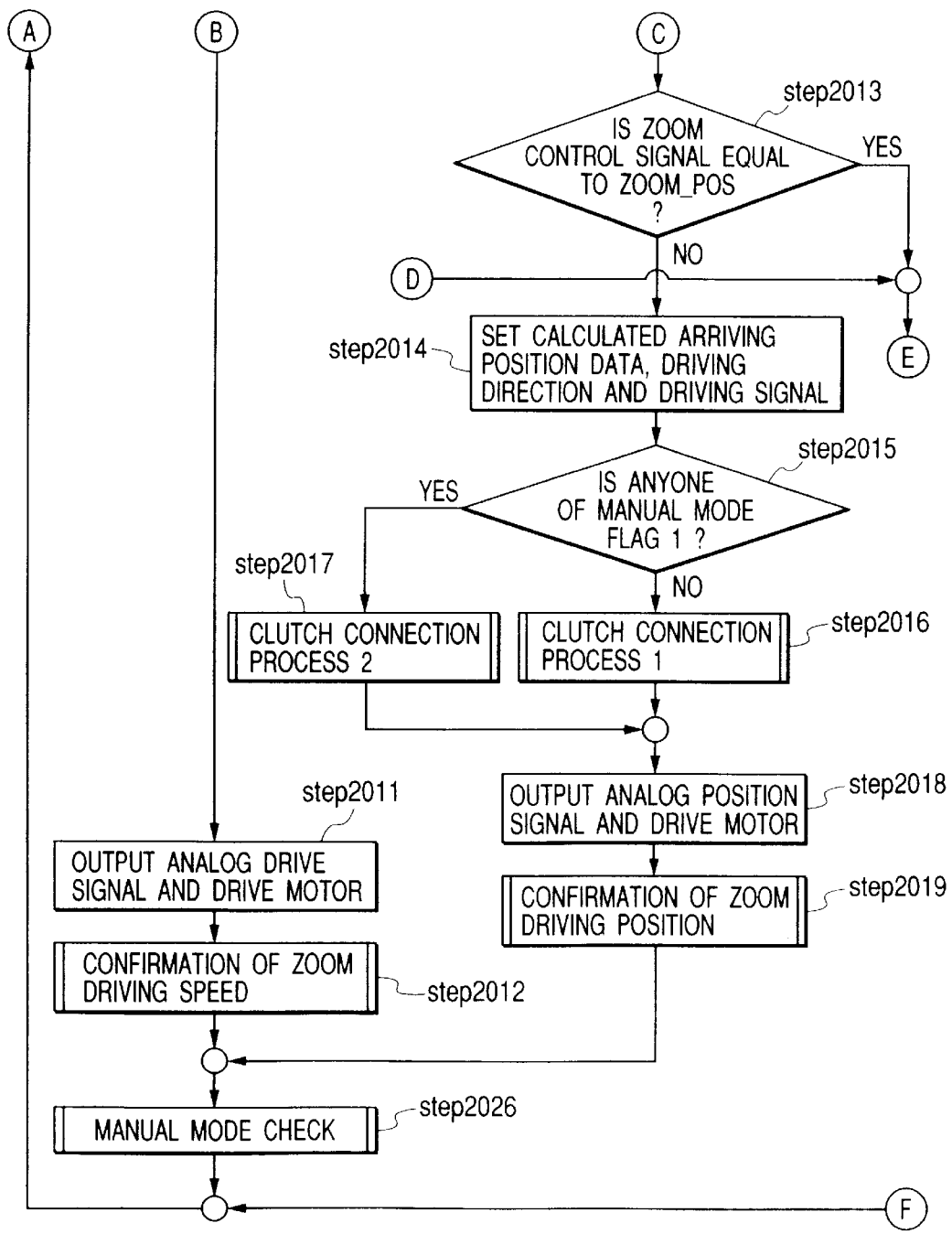
FIG. 14 which is composed of FIGS. 14A, 14B and 14C are main flow charts showing the function of the above-mentioned lens apparatus.
Figure 14C:
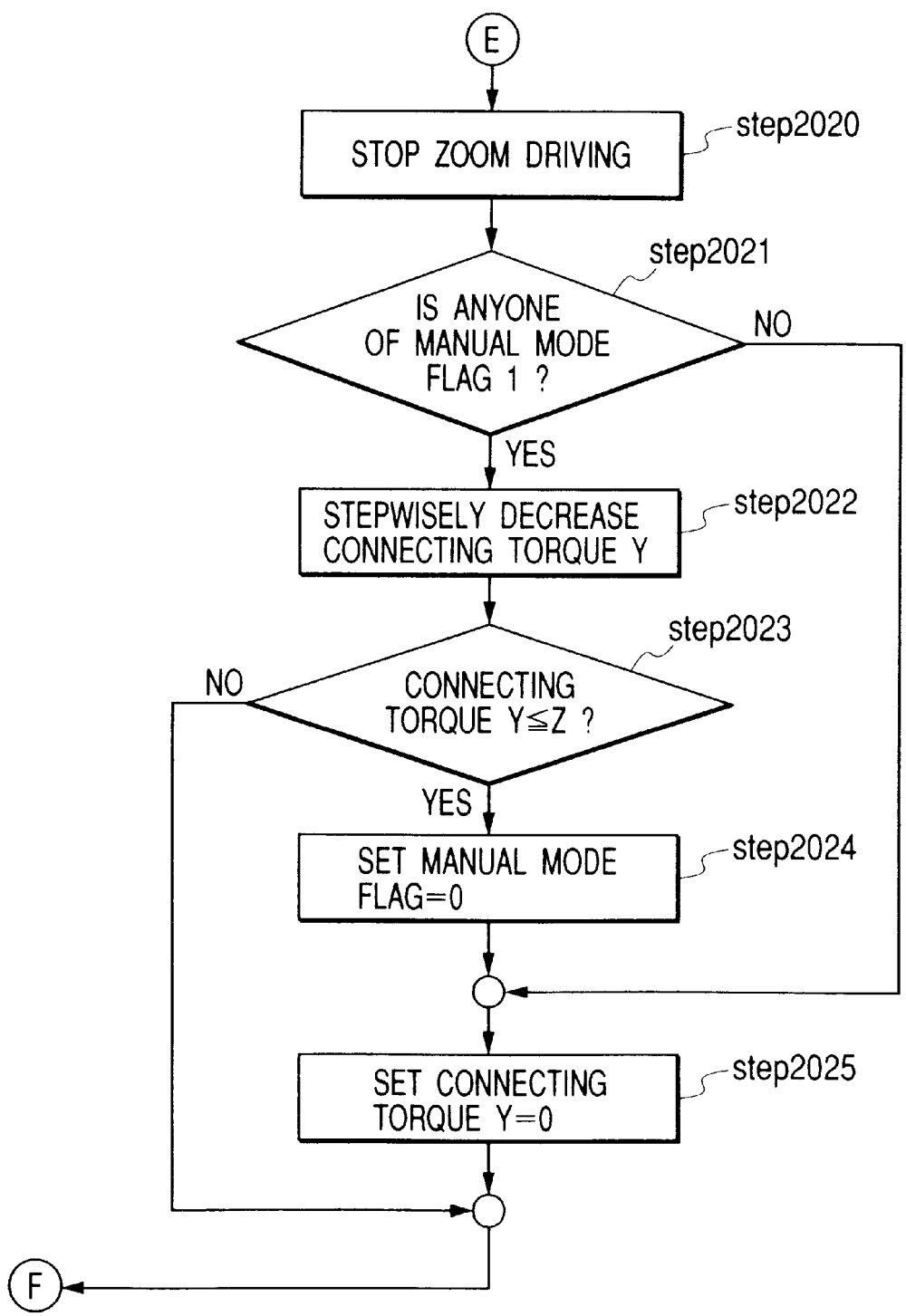

In the following there will be explained the function of the lens apparatus (mainly of the CPU 214) of the above-described configuration, with reference to flow charts shown in FIGS. 14A to 14C and FIGS. 15 to 23, wherein FIGS. 14A to 14C shows a main routine and other drawings show sub routines.

Referring to the main routine shown in FIGS. 14A to 14C, when the power supply of the lens apparatus is turned on (step 2001), the CPU 214 etc. are powered and the CPU 214 executes initialization (step 2002) for the execution of the softwares and for the data constituting parameters required in the present embodiment. More specifically, there is at first entered a current zoom position signal into in memories ZOOM_POS indicating the current zoom position and PRE_ZOOM_POS indicating the zoom position at the acquisition of te previous zoom position signal, as will be explained later. The acquisition of the zoom position signal in each memory will be explained later in a flow chart shown in FIG. 15. Also a manual mode flag, a reverse mode flag, an acceleration mode flag and a deceleration mode flag, constituting manual mode flags indicating the manual operation state, are all set at "0". Also there are entered counter values STOP_DATA=0, REVERSE_DATA=0, P_SPEED_DATA=0 and M_SPEED_DATA=0. These flags will be explained in the flow chart shown in FIG. 19.

After the initializaation as explained in the foregoing, the CPU 214 checks the zoom control signal (step 2003). In this state, the analog zoom control signal outputted in response to the operation of the zoom control switch 211 is converted by the A/D converter 210 into a digital signal which is acceptable to the CPU 214 and supplied to the CPU 214. In case the zoom control switch 211 is not operated, there is entered a center value of the zoom control switch 211.

The sequence then proceeds to a lens position checking subroutine (step 2004) for checking the current lens position.

Figure 15:
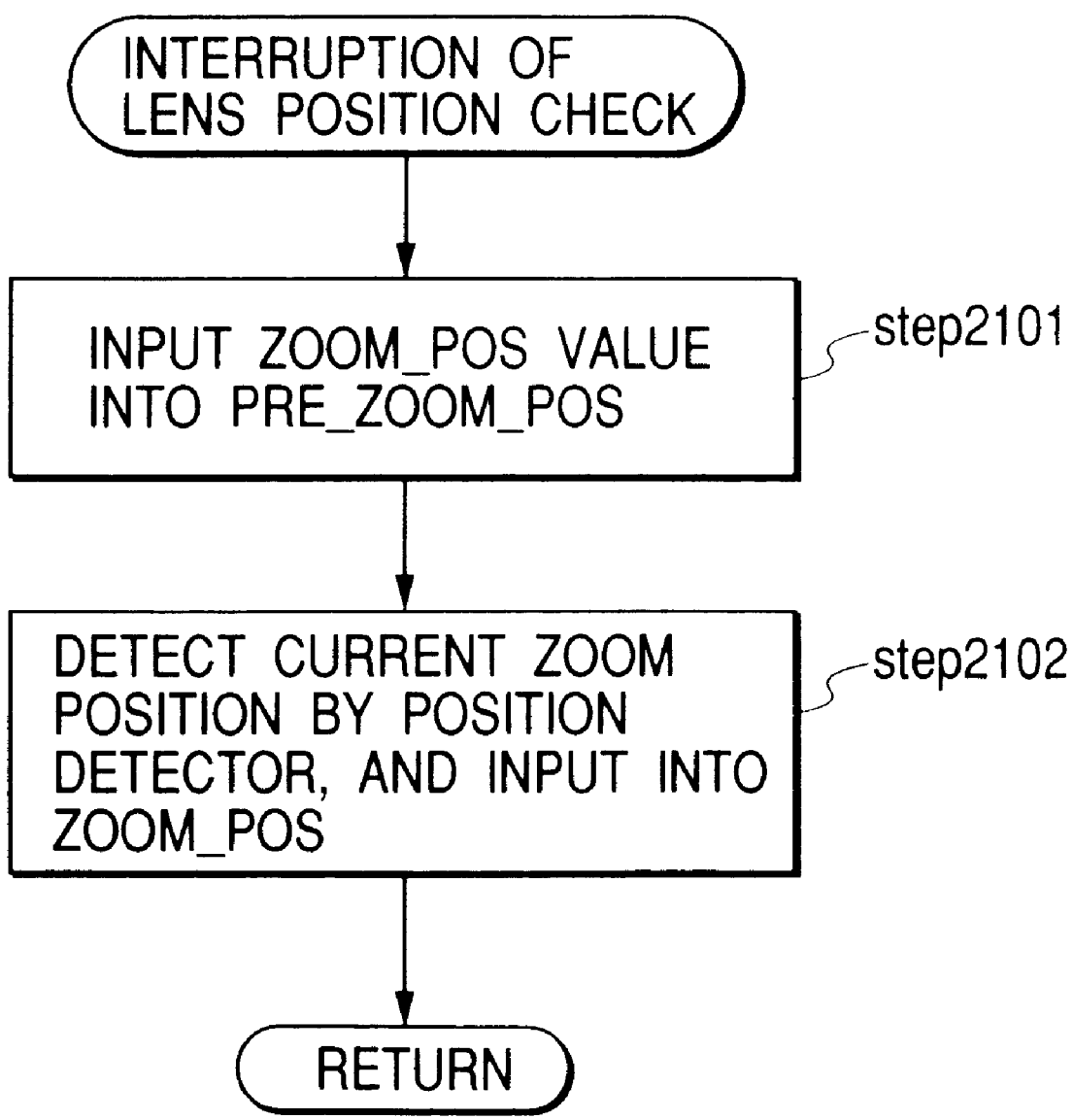
FIG. 15 is a flow chart showing a zoom position detecting operation in the above-mentioned lens apparatus.

In the following the lens position checking subroutine will be explained with reference to a flow chart shown in FIG. 15.

The main body 201 of the image taking lens is connected, through the idler gear 203, to the zoom position detector 202, which is rotated in response to the rotation of the zoom drive ring 201a to output a zoom position signal (analog signal) corresponding to the position thereof. At first the value of ZOOM_POS is entered into the PRE_ZOOM_POS (step 2101) in which stores such value as the zoom position data at the previous detection of the zoom position is stored.

Then the zoom position signal outputted from the zoom position detector 202 is converted by the A/D converter 204 into a digital signal which is acceptable to the CPU 214 and which is entered as the current zoom position data into the ZOOM_POS (step 2102). In order to confirm the zooming operation, since there is required a change in the data within a unit time which is the period of the loop, such loop period has to be modified according to the resolving power of the A/D converter.

After the lens position checking subroutine is terminated, the sequence returns to the flow chart shown in FIGS. 14A to 14C and checks whether the entered zoom control signal is a speed control signal or a position control signal (step 2005). There is provided a separate signal line for judging the speed control or the position control.

In case the zoom control signal is a speed control signal, it is judged whether the entered zoom control signal at step 2003 exceeds a reference value (threshold value) for starting the zooming drive (step 2006). More specifically, in case the zoom control signal ZC satisfies a relation:

$$(V-\alpha) \leq ZC \leq (V+\alpha)$$

wherein V is the center value of the zoom control signal outputted when the zoom control switch 211 is not operated, there is judged the stopping of the zooming and the sequence proceeds to a step 2020. On the other hand, if ZC goes beyond either threshold value, there is executed the zooming. In this case, there are at first set a driving direction and a drive signal calculated from the entered zoom control signal (step 2007). Then there is confirmed whether any of the four manual mode flags (stop mode flag, reverse mode flag, acceleration mode flag and deleceration mode flag) is "1" (step 2008). If none of the flags is "1", there is judged that the manual operation is not executed and the sequence proceeds to the subroutine of a clutch connection process 1 for executing the ordinary clutch connection control.

Figure 16:
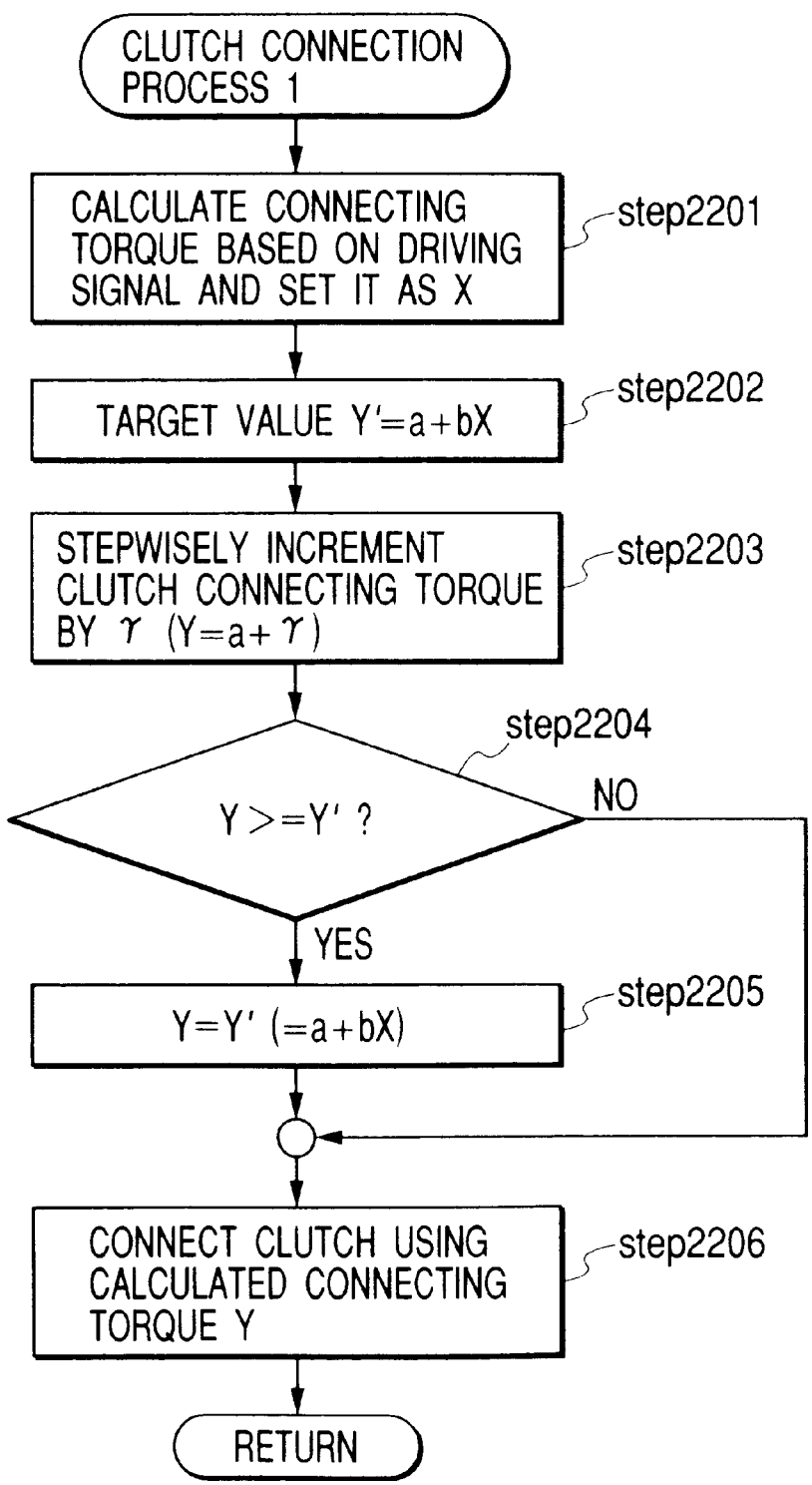
FIG. 16 is a flow chart showing a clutch connection operation 1 in the above-mentioned lens apparatus.

The clutch connection process 1 subroutine will be explained in the following with reference to a flow chart shown in FIG. 16. At first, in order to determine the connection torque to be finally set on the clutch 205, a parameter X is calculated from the drive signal (step 2201).

Then thus determined X and a minimum connection torque a constituting a reference amount are used to calculate a target connection torque Y' by:

$$Y=a+bX$$

(step 2202). The clutch 205 shows a larger connection torque with an increase in the entered connection control signal.

The above-mentioned value a is the value of the drive signal when the zoom control signal is at either threshold value (ZC=V+α or V−α), namely the minimum value of the connection torque capable of driving without slipping or stopping when the clutch is driven with the drive signal calculatged from the minimum zoom control signal allowing the electrical drive of zoom lens optical system.

Figure 24:
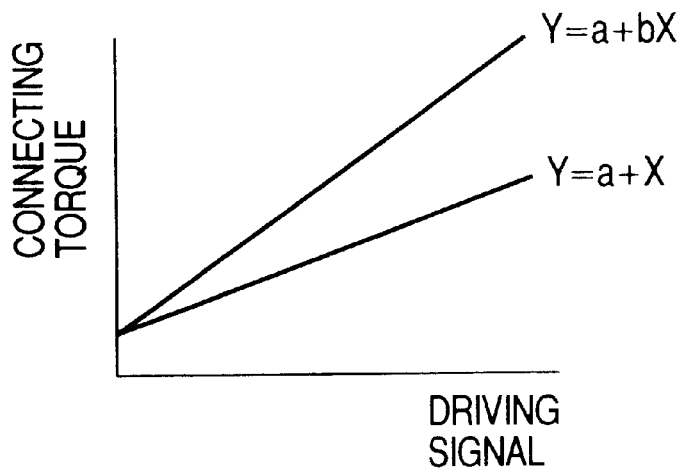
FIG. 24 is a chart showing the relationship between the connection torque and the drive signal in ordinary electrical drive of the clutch in the above-mentioned lens apparatus.

The minimum connection torque a alone results in slipping, since the zoom speed increases with an increase in the drive signal. Therefore the value X is so calculated as to obtain a minimum connecction torque Y=a+X capable of preventing such slippage and allowing drive with a drive speed corresponding to the output drive signal. More specifically, the calculation is so made as to obtain a torque relationship as shown in FIG. 24.

The parameter b is so determined as to obtain a minimum connection torque without slippage, even under a load applied from the exterior and with a higher connection torque, and is also used for compensating the change in the torque required for the drive in the different lens apparatus.

The value Y' is represented by a first-order function, but may also be represented by a second-order function or other functions.

After the calculation of the target connection torque Y' in the above-described manner, the connection torque Y is increased stepwisly in such a manner that the connection torque Y becomes equal to the target connection torque Y' (step 2203). More specifically, the CPU 214 outputs a connection control signal in such a manner as to increase the connection torque Y by a predetermined amount γ in each cycle of the main routine (Y=Y+γ).

Then at step 2204, it is confirmed whether the current connection torque Y is at least equal to the target connection torque Y', and, if Y<Y', the sequence proceeds to a step 2206 wherein the CPU 214 so outputs the connection control signal that the connection torque becomes such value of Y (=Y+γ). The connection control signal is converted into an analog signal by the D/A converter 213, and is supplied through the connection control circuit 212 to the clutch 205. In case the clutch 205 is composed of an electromagnetic clutch, the connection torque can be varied by a change in the applied voltage.

On the other hand, in case of identifying a situation Y≧Y' at step 2204, the sequence proceeds to a step 2205 for setting:

$$Y=Y' \ (=a+bX).$$

The CPU 214 outputs the connection control signal in such a manner that the connection torque assumes the value Y. The connection control signal is converted into an analog signal by the D/A converter 213 and is supplied through the connection control circuit 212 to the clutch 205 (step 2206).

After the completion of each cycle of the clutch connection process 1 subroutine, the sequence proceeds to a step 2011 in the flow chart shown in FIGS. 14A to 14C.

On the other hand, in case, at the step 2008 in FIGS. 14A to 14C, it is identified that any of the four manual mode flags (stop mode flag, reverse mode flag, acceleration mode flag and deceleration mode flag) is "1", the sequence proceeds to a subroutine of a clutch connection process 2 (step 2010).

The clutch connection process 2 subroutine will be explained later. After the completion of each cycle of the clutch connection process 2 subroutine, the sequence proceeds to the step 2011 in the flow chart shown in FIGS. 14A to 14C.

At step 2011, the clutch 205 is connected with the connection torque Y calculated in the aforementioned clutch connection process subroutines, and the driving direction and the drive signal, set in the step 2007, are converted into analog signals by the D/A converter 209 and thus obtained analog drive signals are output to the drive circuit 208, which rotates the driving motor 207 in accordance with the output signal. The rotation of the motor 207 is transmitted through the idler gear 206 to the zoom drive ring 201a, thereby initiating the electrical drive of the zoom lens optical system.

After the electrical drive of the zoom lens optical system is started in this manner, the sequence proceeds to a zoom drive confirming (speed) subroutine in a step 2012. In this subroutine, it is confirmed whether the rotation of the zoom drive ring 201a by the electrical zooming drive based on the drive signal and the actual rotation of the the zoom drive ring 201a are correct.

Figure 17:
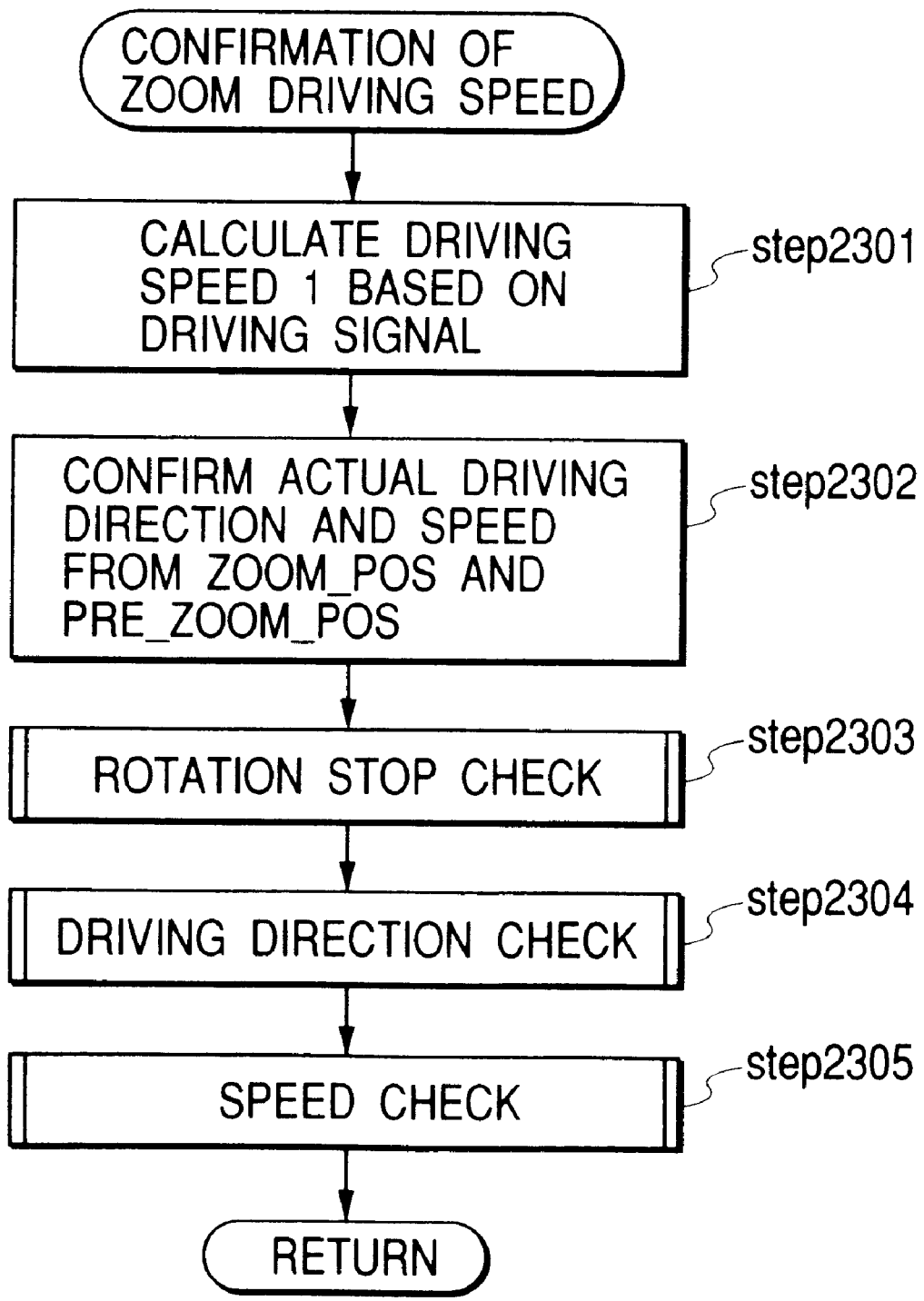
FIG. 17 is a flow chart showing a zoom drive confirmation (speed) process in the above-mentioned lens apparatus.

In the following there will be explained the zoom drive confirming (speed) subroutine with reference to a flow chart shown in FIG. 17. At first the CPU 214 calculates a drive speed 1, from the drive signal set in the step 2007 shown in FIGS. 14A to 14C (step 2301). The calculated value constitutes the standard speed in case of the ordinary electrical drive by the drive signal.

Then there are calculated the actual drive direction and the actual drive speed from ZOOM_POS and PRE_ZOOM_POS entered from the zoom position detector 202 into the CPU 214 in the step 2004 (step 2302). Since this software is repeated with a predetermined cycle period, the drive speed can be calculated from the difference between the ZOOM_POS and the PRE_ZOOM_POS and the cycle time. Based on the data determined in the steps 2301 and 2302, there is confirmed whether a manual operation is executed in the course of the electrical drive. Then, the sequence proceeds to a rotation stop checking subroutine (step 2303).

The rotation stop checking subroutine will be explained with reference to a flow chart shown in FIG. 21. At first the ZOOM_POS is compared with the PRE_ZOOM_POS to confirm whether these two data are mutually equal (step 2701). If not equal (a non-stopped state), a counter STOP_DATA for judging the stopping of rotation is cleared to set STOP_DATA=0 (step 2702).

On the other hand, if the two data are mutually equal (a steopped state), the count of the counter STOP_DATA is increased by one (STOP_DATA=STOP_DATA+1) (step 2703).

Then there is confirmed whether the value of the STOP_DATA exceeds a threshold value S1 (step 2704). In case the value of the STOP_DATA exceeds the threshold value S1, namely in case the zoom position data do not change during a number of routine cycles corresponding to the threshold value S1, there is judged a state in which the zoom drive ring 201a is forcedly stopped by a manual operation in the course of the electrical zooming drive, whereby a manual stop mode is set (step 2705) and the sequence returns to the zoom drive confirming (speed) subroutine.

In case the value of the STOP_DATA does not exceed the threshold value S1, the manual stop mode is canceled (step 2706) and the sequence returns to the zoom drive confirming (speed) subroutine. The threshold value S1 is variable depending on the loop period of the software and since it can be calculated by multiplying value S1 by the cycle period, it can be determined according to the times of the cycle period.

After the rotation stop checking subroutine, the sequence proceeds, in the zoom drive confirming (speed) routine, to a drive direction checking subroutine.

The drive direction checking subroutine will be explained with reference to a flow chart shown in FIG. 22. At first there is confirmed whether the set drive direction is equal to the actual drive direction determined from the ZOOM_POS and the PRE_ZOOM_POS (step 2801). If equal a counter RREVERSE_DATA for judging the normal drive direction is cleared to set REVERSE_DATA=0 (step 2802).

On the other hand, if the two data are not equal, the count of the counter REVERSE_DATA is increased by one (REVERSE_DATA=REVERSE_DATA+1) (step 2803).

Then there is confirmed whether the value of the REVERSE_DATA exceeds a threshold value R1 (step 2804). In case the value of the REVERSE_DATA exceeds the threshold value R1, namely in case the drive direction is not normal during a number of routine cycles corresponding to the threshold value R1, there is judged a state in which the zoom drive ring 201a is forcedly reversed by a manual operation in the course of the electrical zooming drive, whereby a manual reverse mode is set (step 2805) and the sequence returns to the zoom drive confirming (speed) subroutine.

In case the value of the REVERSE_DATA does not exceed the threshold value R1, the manual stop mode is canceled (step 2806) and the sequence returns to the zoom drive confirming (speed) subroutine. The threshold value R1 is variable depending on the loop period of the software and since it can be calculated by multiplying value R1 by the cycle period, it can be determined according to the times of the cycle period.

Then the sequence proceeds, in the zoom drive confirming (speed) routine, to a speed checking subroutine.

The speed checking subroutine will be explained with reference to a flow chart shown in FIG. 23. At first there is confirmed whether a drive speed 1 calculated in the step 2301 in FIG. 17 is equal to the actual drive speed determined from the ZOOM_POS and the PRE_ZOOM_POS (step 2901). If equal (drive with a normal drive speed), counters P_SPEED_DATA and M_SPEED_DATA for judging whether the drive speed is correct are cleared to set P_SPEED_DATA=0 and M_SPEED_DATA=0 (step 2902).

On the other hand, if the two data are not mutually equal, there is confirmed whether the drive speed 1 or the actual drive speed is larger (step 2903), namely whether the actual drive speed is higher or lower than the set drive speed. If the drive speed 1 is larger than the actual drive speed, namely if the actual drive speed is lower or if the speed is decelerated, the count of the counter M_SPEED_DATA is increased by one (M_SPEED_DATA=M=SPEED_DATA+1) (step 2904). As no acceleration is executed in this case, the counter P_SPEED_DATA is cleared to 0 (step 2905).

Also if at step 2903, it is identified that the drive speed 1 is smaller than the actual drive speed, namely if the actual drive speed is higher or if the speed is accelerated, the count of the counter P_SPEED_DATA is increased by one (P_SPEED_DATA=P=SPEED_DATA+1) (step 2906). As no deceleration is executed in this case, the counter M_SPEED_DATA is cleared to 0 (step 2907).

When the sequence proceeds to a step 2908 from the step 2902, 2905 or 2907, there is confirmed whether the value of the P_SPEED_DATA exceeds a threshold value P1. In case the value of the P_SPEED_DATA exceeds the threshold value P1, namely in case the actual drive speed is larger during a number of routine cycles corresponding to the threshold value P1, there is judged a state in which the zoom drive ring 201a is forcedly driven in the accelerating direction by a manual operation in the course of the electrical zooming drive, whereby a manual acceleration mode is set (step 2909) and the sequence returns to the zoom drive confirming (speed) subroutine.

On the other hand, in case the value of the P_SPEED_DATA does not exceed the threshold value P1, the manual acceleration mode is canceled (step 2910) and the sequence proceeds to a step 2911.

At step 2911, it is confirmed whether the value of the M_SPEED_DATA exceeds a threshold value M1. In case the value of the M_SPEED_DATA exceeds the threshold value M1, namely in case the actual drive speed is smaller during a number of routine cycles corresponding to the threshold value M1, there is judged a state in which the zoom drive ring 201a is forcedly driven in the decelerating direction by a manual operation in the course of the electrical zooming drive, whereby a manual deceleration mode is set (step 2912) and the sequence returns to the zoom drive confirming (speed) subroutine.

On the other hand, in case the value of the M_SPEED_DATA does not exceed the threshold value M1, the manual deceleration mode is canceled (step 2913) and the sequence returns to the zoom drive confirming (speed) subroutine.

The threshold values P1, M1 are variable depending on the loop period of the software and since it can be calculated by multiplying value P1 (or M1) by the cycle period, it can be determined according to the times of the cycle period.

After the zoom drive confirming (speed) subroutine, the sequence returns to the main flow charts shown in FIGS. 14A to 14C.

In the foregoing there has been explained a case where, at step 2005 in FIGS. 14A to 14C, it is identified that the zoom control signal is a speed control signal, In the following there will be explained a case where the zoom control signal is a position control signal.

In case, at step 2005 in FIGS. 14A to 14C, it is judged that the entered zoom control signal is a position control signal, since the entered signal is same as the data of the ZOOM_POS, the zoom control signal is compared with the ZOOM_POS indicating the current zoom position and there is judged whether these two data are mutually equal (step 2013). If equal, there is judged a zoom stopping state and the sequence proceeds to a step 2020, but, if not equal, there is judged a zoom drive state and the sequence proceeds to a step 2014.

At step 2014, reached position data calculated from the entered zoom control signal, the drive direction and the drive signal are set. Then there is confirmed whether any of the four manual mode flags (stop mode flag, reverse mode flag, acceleration mode flag and deleceration mode flag) is "1" (step 2015). If none of the flags is "1", there is judged that the manual operation is not executed and the sequence proceeds to the aforementioned subroutine of the clutch connection process 1 for executing the ordinary clutch connection control. After the completion of each cycle of the clutch connection process 1 subroutine, the sequence proceeds to a step 2018.

On the other hand, in case any of the four manual mode flags is "1", the sequence proceeds to a subroutine of a clutch connection process 2 (step 2017). The clutch connection process 2 subroutine will be explained later. After the completion of each cycle of the clutch connection process 2 subroutine, the sequence proceeds to the step 2018.

At step 2018, the clutch 205 is connected with the connection torque Y calculated in the aforementioned clutch connection process subroutines. Also the drive direction and the drive signal, set in the step 2014, are converted into analog signals by the D/A converter 209 and thus obtained analog drive signals are outputted to the drive circuit 208, which rotates the driving motor 207 based on the output signal, thereby starting the drive of the zoom drive ring 201a through the idler gear 206 (step 2018). Thereafter the reached position data and the ZOOM_POS are constantly compared, and the drive motor 207 is stopped when the two become mutually equal. Such stopping process will be explained later.

The sequence proceeds from the step 2018 to a zoom drive confirming (position) subroutine (step 2019), for confirming whether the zoom drive by the drive signal matches the actual rotation of the zoom drive ring 201a.

In the following there will be explained the zoom drive confirming (position) subroutine with reference to a flow chart shown in FIG. 18. At first the CPU 214 compares the reached position data set in the step 2014 shown in FIGS. 14A to 14C and the ZOOM_POS indicating the current zoom position, and judges whether these two data are mutually equal (step 2401). If equal, the subroutine is terminated and the sequence proceeds to the main flow charts shown in FIGS. 14A to 14C. If not equal, there is calculated a drive speed 2, from ZOOM_POS indicating the current zoom position, the reached position data and the drive signal (step 2402). The calculated value constitutes the standard speed in case of the ordinary electrical drive by the drive signal.

Then there are calculated the current drive direction and the current drive speed from ZOOM_POS and PRE_ZOOM_POS entered from the zoom position detector 202 into the CPU 214 in the step 2004 shown in FIGS. 14A to 14C (step 2403). Since this software is repeated with a predetermined cycle period, the drive speed can be calculated from the difference between the ZOOM_POS and the PRE_ZOOM_POS and the cycle time. Based on the data determined in the steps 2402 and 2403, there is confirmed whether a manual operation is executed in the course of the electrical drive.

Figure 21:
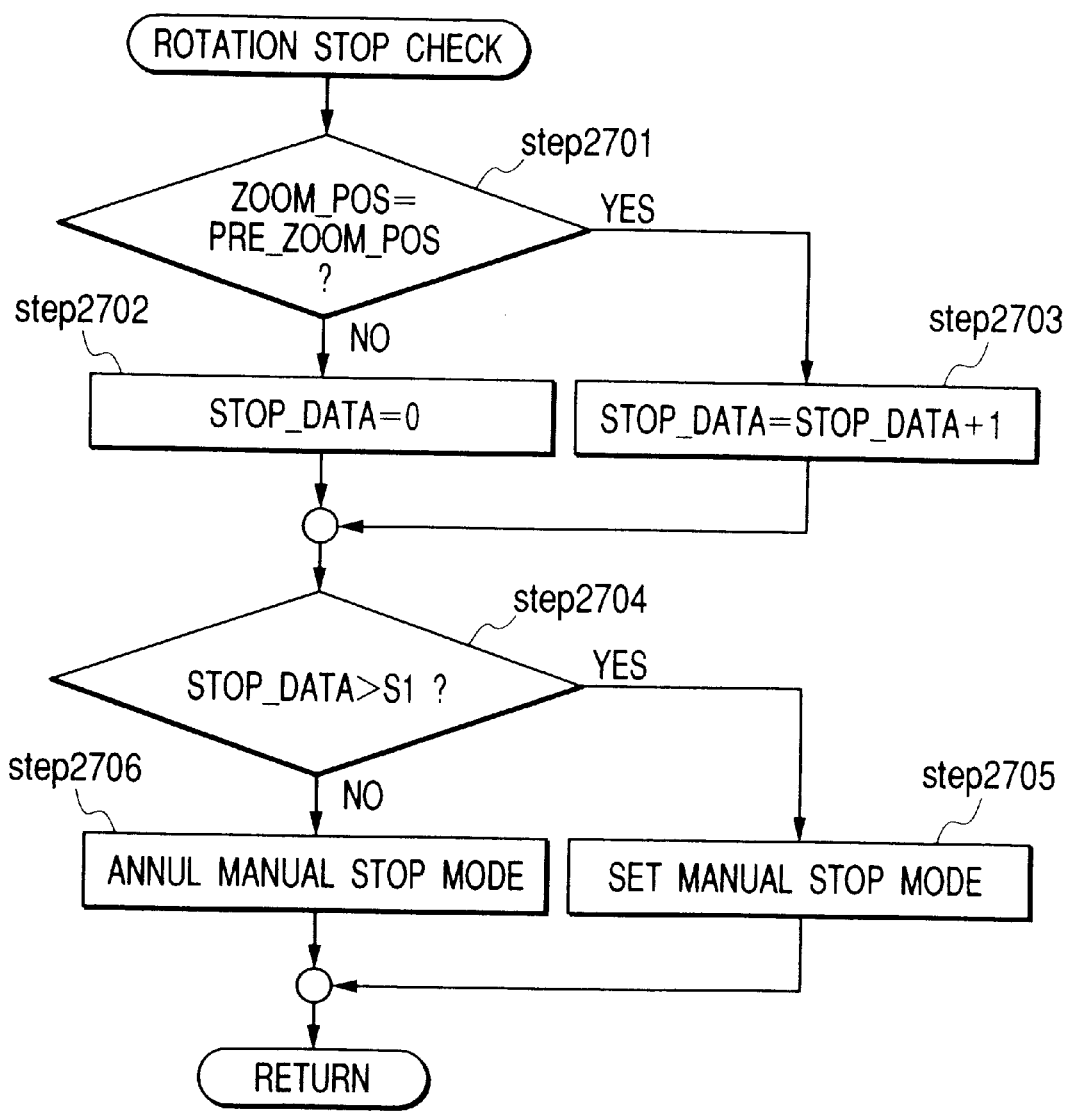
FIG. 21 is a flow chart showing a rotation stop check process in the above-mentioned lens apparatus.
Figure 22:
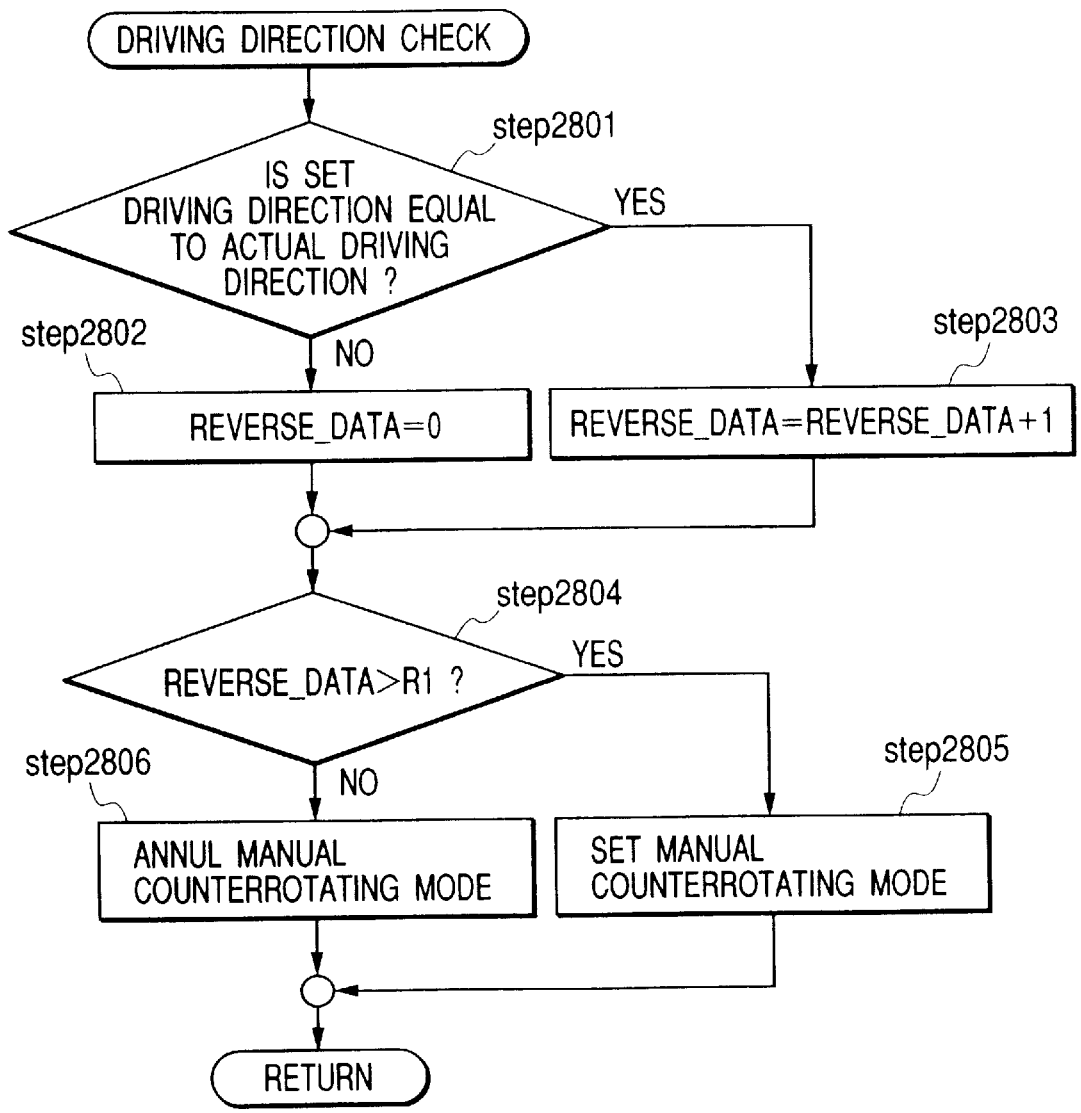
FIG. 22 is a flow chart showing a drive direction check process in the above-mentioned lens apparatus.
Figure 23:
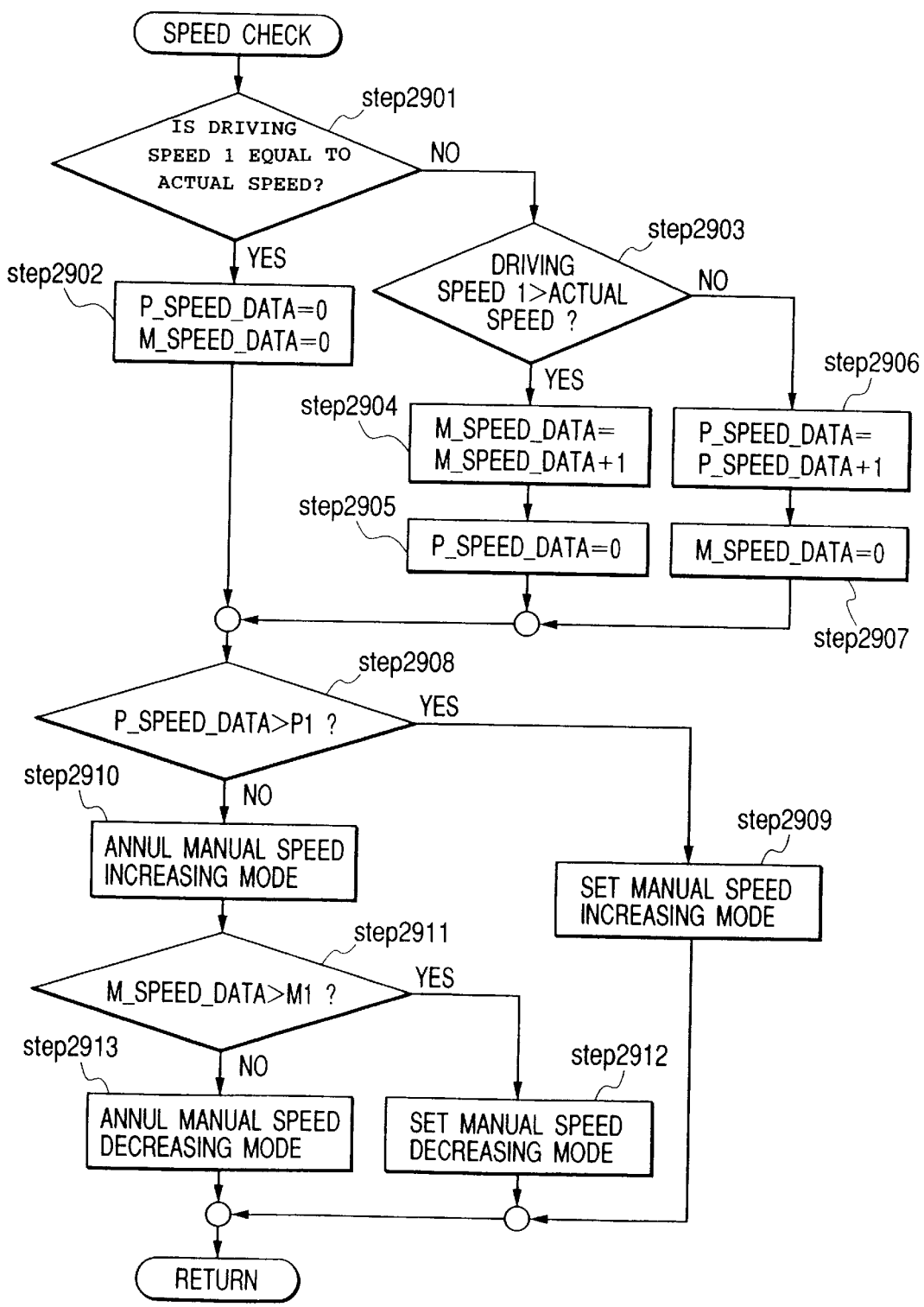
FIG. 23 is a flow chart showing a speed check process in the above-mentioned lens apparatus.

At first the sequence proceeds to the aforementioned rotation stop checking subroutine (step 1404) explained in FIG. 21, then to the aforementioned drive direction checking subroutine shown in FIG. 22 (step 2405) and to the aforementioned speed check subroutine shown in FIG. 23 (step 2406).

Figure 18:
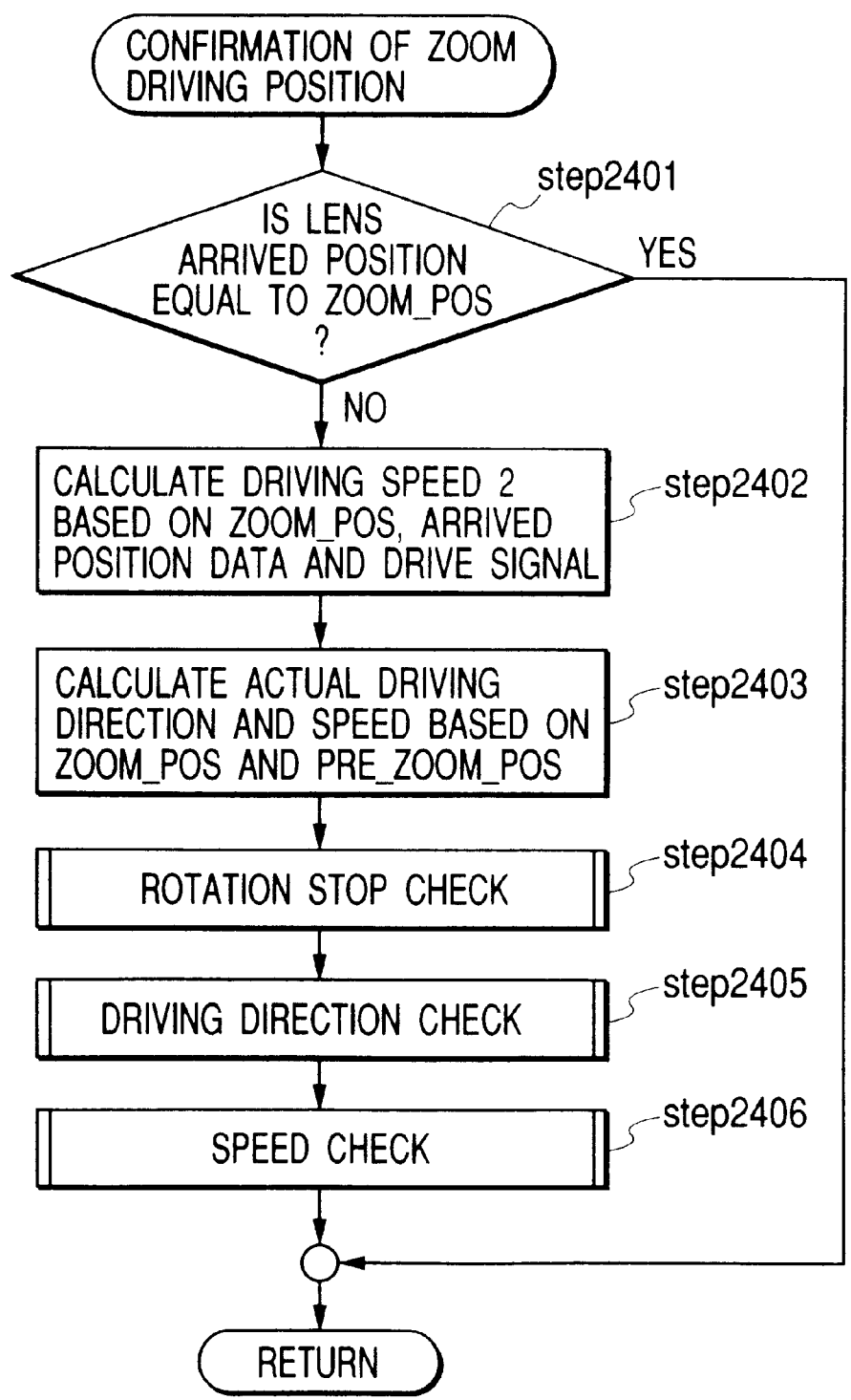
FIG. 18 is a flow chart showing a zoom drive confirmation (position) process in the above-mentioned lens apparatus.

After the completion of these check subroutines, the sequence returns to the flow chart shown in FIG. 18, and, after a subroutine process therein, returns to the main flow charts shown in FIGS. 14A to 14C.

In the main flow chart, after the zoom drive confirming (speed) subroutine in the step 2012 and the zoom drive confirming (position) subroutine in the step 2019, the sequence proceeds to a manual mode check subroutine (step 2026).

Figure 19:
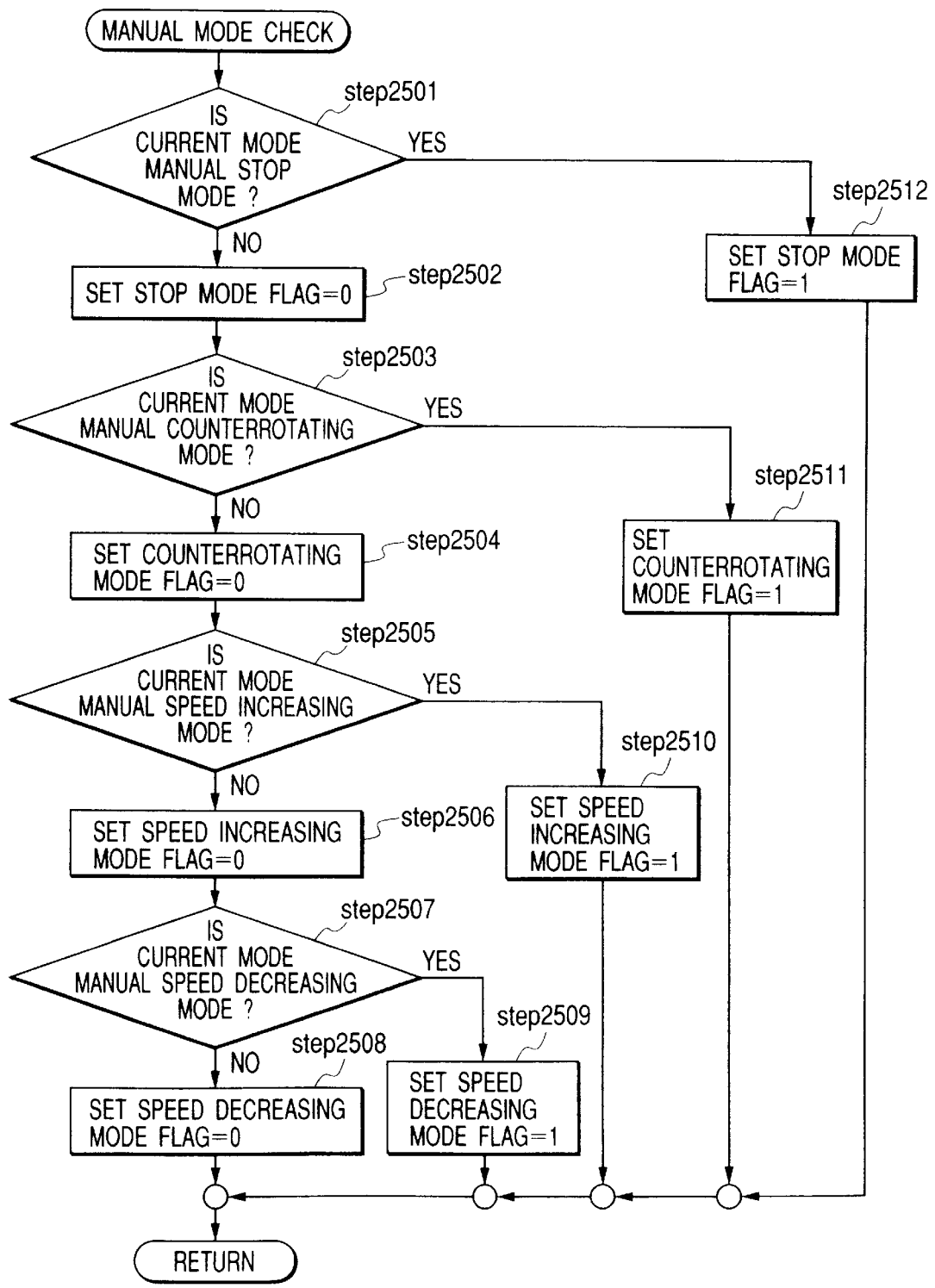
FIG. 19 is a flow chart showing a manual mode check process in the above-mentioned lens apparatus.

The manual mode checking subroutine will be explained with reference to a flow chart shown in FIG. 19. This subroutine is to confirm the manual operation status in case a manual operation is identified in the course of the electrical drive by the aforementioned zoom drive confirming (speed) subroutine or zoom drive confirming (position) subroutine, and to set a mode according to such manual operation.

At first there is confirmed whether the manual stop mode is executed (step 2501). If executed, the stop mode flag is set at "1" (step 2512) and the manual mode check subroutine is terminated, whereupon the sequence returns to the main flow charts shown in FIGS. 14A to 14C.

If the manual stop mode is not executed, the stop mode flag is set at "0" (step 2502) and there is confirmed whether the manual reverse mode is executed (step 2503). If executed, the reverse mode flag is set at "1" (step 2511) and the manual mode check subroutine is terminated, whereupon the sequence returns to the main flow charts shown in FIGS. 14A to 14C.

If the manual reverse mode is not executed, the reverse mode flag is set at "0" (step 2504) and there is confirmed whether the manual acceleration mode is executed (step 2505). If executed, the acceleration mode flag is set at "1" (step 2510) and the manual mode check subroutine is terminated, whereupon the sequence returns to the main flow charts shown in FIGS. 14A to 14C.

If the manual acceleration mode is not executed, the acceleration mode flag is set at "0" (step 2506) and there is confirmed whether the manual deceleration mode is executed (step 2507). If executed, the deceleration mode flag is set at "1" (step 2509) and the manual mode check subroutine is terminated, whereupon the sequence returns to the main flow chart shown in FIGS. 14A to 14C.

If the manual deceleration mode is not executed, the deceleration mode flag is set at "0" and the manual mode check subroutine is terminated, whereupon the sequence returns to the main flow charts shown in FIGS. 14A to 14C.

In the aforementioned clutch connection process 2 subroutine in the steps 2010 and 2017, the flag set in the manual mode check subroutine is confirmed and the connection torque of the clutch 205 in case of a manual operation in the course of the electrical drive is determined.

Figure 20:
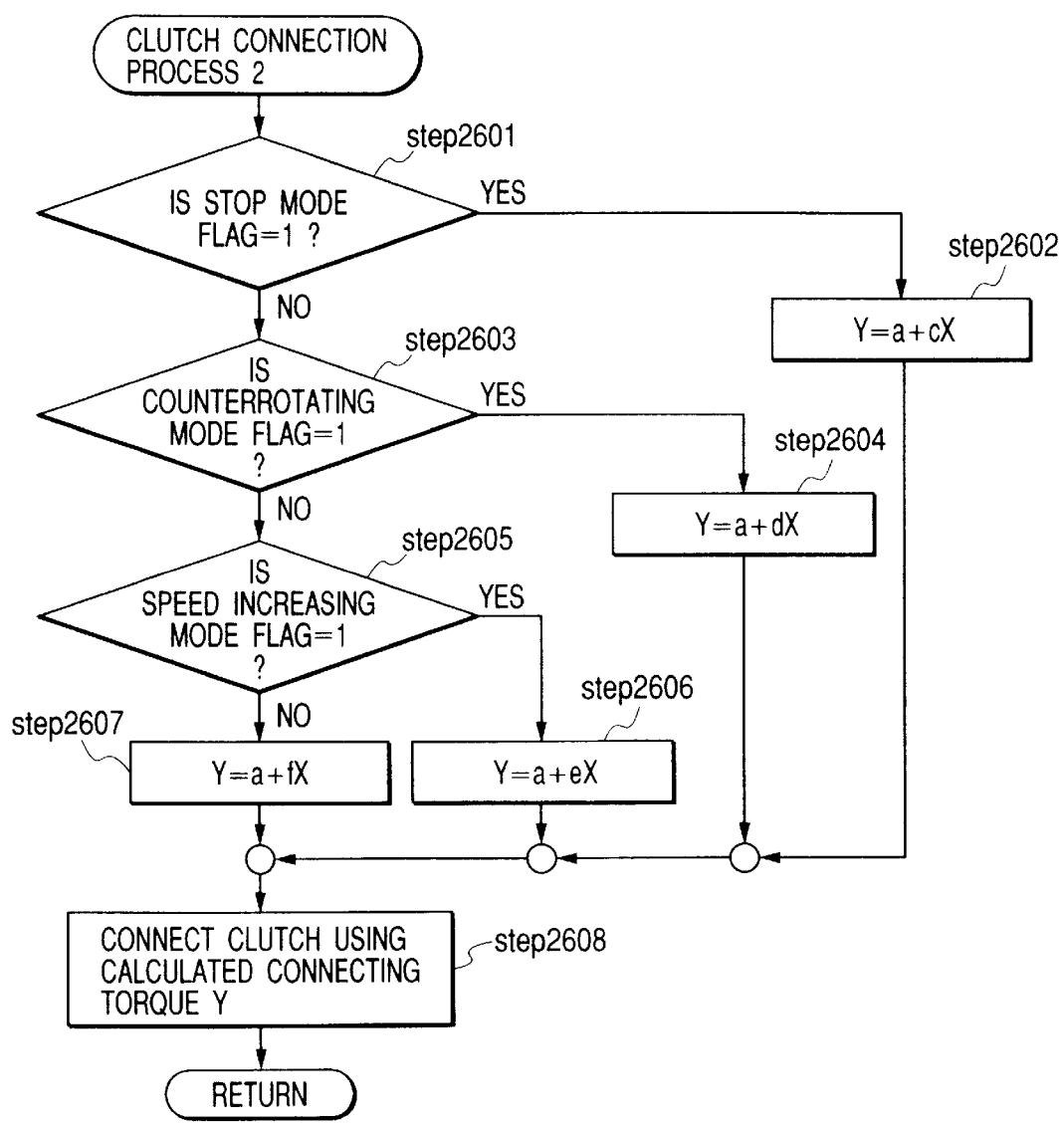
FIG. 20 is a flow chart showing a clutch connection process 2 in the above-mentioned lens apparatus.

Now the clutch connection process 2 subroutine will be explained with reference to a flow chart shown in FIG. 20. At first there is confirmed whether the stop mode flag=1 (step 2601). If the stop mode flag=1 indicating the execution of a manual operation in the course of the electrical drive, the connection torque Y is determined with a connection torque parameter X determined from the drive signal and a minimum reference value a of the connection torque, by:

$$Y = a + cX$$

(step 2602).

As explained in the foregoing, the connection with the minimum connection torque a alone results in slipping, since the zoom speed increases with an increase in the drive signal. Therefore the value X is so calculated as to obtain a minimum connecction torque $Y=a+X$ capable of preventing such slippage and allowing drive with a drive speed corresponding to the output drive signal.

More specifically, the parameter c is so determined that the connection torque $Y=a+cX$ is smaller than the connection torque $Y=a+bX$ at the normal electrical drive (without manual operation in the course of the electrical drive) and larger than $Y=a+X$.

More specifically, c is so determined as to obtain a torque relationship:

$$a + bX \geq a + cX \geq a + X$$

thereby enabling a slipping of the clutch 205 by the manual operation.

Thus, in case a manual stopping operation is executed in the course of the electrical drive, the connection torque of the clutch 205 becomes smaller than the connection torque in the normal electrical drive, so that, in comparison with a case where the connection torque of the normal electrical drive is maintained, the zoom drive ring 201a (namely the zoom lens optical system) can be stopped with a small manual operating force while the drive motor 207 is rotated. In such state, in the clutch 205, the components of the side of the zoom lens optical system and those of the motor side execute mutual slipping.

However, since there is secured a minimum connection torque enabling electrical drive, the electrical drive in the normal drive direction can be immediately restored when the hand of the operator is released from the manual stopping operation.

In case, at step 2601, it is identified that the stop mode flag is not "1", there is confirmed whether the reverse mode flag=1 (step 2603). If the reverse mode flag=1, the current state is identified as a state of a manual reverse operation in the course of the electrical drive, wherein the connection torque Y is given by:

$$Y = a + dX$$

based on the connection torque parameter X determined from the drive signal and the minimum reference connection torque a (step 2604).

More specifically, the parameter d is so determined that the connection torque $Y=a+dX$ is smaller than the connection torque $Y=a+bX$ at the normal electrical drive and larger than $Y=a+X$.

More specifically, d is so determined as to obtain a torque relationship:

$$a+bX \geq a+dX \geq a+X$$

thereby enabling a slipping of the clutch 205 by the manual operation.

Thus, in case a manual reversing operation is executed in the course of the electrical drive, the connection torque of the clutch 205 becomes smaller than the connection torque in the normal electrical drive, so that, in comparison with a case where the connection torque of the normal electrical drive is maintained, the zoom drive ring 201a (namely the zoom lens optical system) can be driven in the reverse direction with a small manual operating force while the drive motor 207 is rotated. In such state, in the clutch 205, the components of the side of the zoom lens optical system and those of the motor side execute mutual slipping.

However, since there is secured a minimum connection torque enabling electrical drive, the electrical drive in the normal drive direction can be immediately restored when the hand of the operator is released from the manual stopping operation.

In case, at step 2603, it is identified that the reverse mode flag is not "1", there is confirmed whether the acceleration mode flag=1 (step 2605). If the acceleration mode flag=1, the current state is identified as a state of a manual accelerating operation in the course of the electrical drive, wherein the connection torque Y is given by:

$$Y=a+eX$$

based on the connection torque parameter X determined from the drive signal and the minimum reference connection torque a (step 2606).

More specifically, the parameter e is so determined that the connection torque Y=a+eX is smaller than the connection torque Y=a+bX at the normal electrical drive and larger than Y=a+X.

More specifically, e is so determined as to obtain a torque relationship:

$$a+bX \geq a+eX \geq a+X$$

thereby enabling a slipping of the clutch 205 by the manual operation.

Thus, in case a manual accelerating operation is executed in the course of the electrical drive, the connection torque of the clutch 205 becomes smaller than the connection torque in the normal electrical drive, so that, in comparison with a case where the connection torque of the normal electrical drive is maintained, the zoom drive ring 201a can be driven in the accelerating direction (forward direction) with a small manual operating force while the drive motor 207 is rotated, thereby accelerating the zoom lens optical system. In such state, in the clutch 205, the components of the side of the zoom lens optical system and those of the motor side execute mutual slipping.

However, since there is secured a minimum connection torque enabling electrical drive, the electrical drive in the normal drive direction and drive speed can be immediately restored when the hand of the operator is released from the manual accelerating operation.

In case, at step 2605, it is identified that the acceleration mode flag is not "1", there is determined the manual deceleration mode in which a manual decelerating operation is executed in the course of the electrical drive, and in which the connection torque Y is given by:

$$Y=a+fX$$

based on the connection torque parameter X determined from the drive signal and the minimum reference connection torque a (step 2607).

More specifically, the parameter f is so determined that the connection torque Y=a+fX is smaller than the connection torque Y=a+bX at the normal electrical drive and larger than Y=a+X.

Thus, f is so determined as to obtain a torque relationship:

$$a+bX \geq a+fX \geq a+X$$

thereby enabling a slipping of the clutch 205 by the manual operation.

Thus, in case a manual decelerating operation is executed in the course of the electrical drive, the connection torque of the clutch 205 becomes smaller than the connection torque in the normal electrical drive, so that, in comparison with a case where the connection torque of the normal electrical drive is maintained, the zoom drive ring 201a can be driven in the decelerating direction (reverse direction) with a small manual operating force while the drive motor 207 is rotated, thereby decelerating the zoom lens optical system. In such state, in the clutch 205, the components of the side of the zoom lens optical system and those of the motor side execute mutual slipping.

However, since there is secured a minimum connection torque enabling electrical drive, the electrical drive in the normal drive direction and drive speed can be immediately restored when the hand of the operator is released from the manual decelerating operation.

Thus, when the target connection torque is calculated in the step 2602, 2604, 2606 or 2607, a connection control signal is outputted from the CPU 214 corresponding to such target connection torque, then converted into an analog signal by the D/A converter 213 and entered into the clutch 205 through the connection control circuit 212, whereby a connection torque equal to the target connection torque can be obtained in the clutch 205.

However, in order to determine the connection torque Y in the manual modes, there are required parameters c, d, e and f. These parameters are smaller than b, but can be varied in magnitude according to the situation of use.

Figure 25:
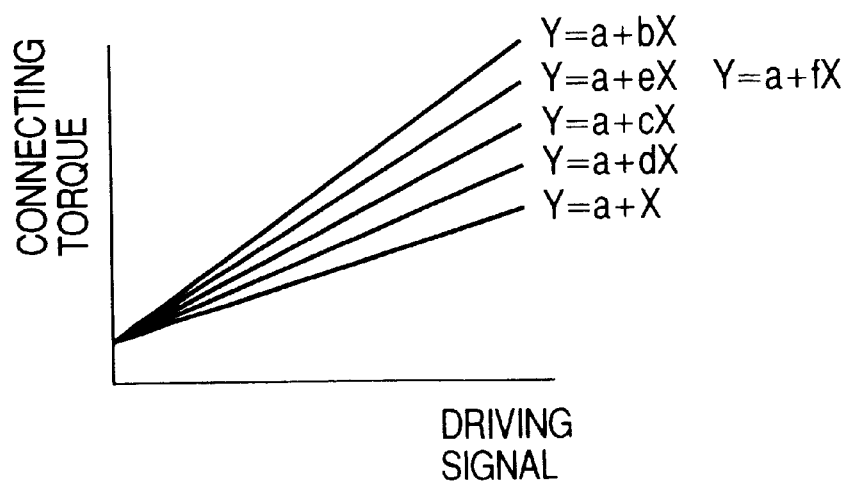
FIG. 25 is a chart showing the relationship between the connection torque and the drive signal in case of a manual operation in the course of the electrical drive of the above-mentioned lens apparatus.

For example, in the manual stopping mode and in the manual reversing mode, the manual operation is executed completely against the electrical drive, so that the connection torque of the clutch 205 is preferably as small as possible. Also in the comparison with the manual stopping mode and the manual reversing mode, the manual operation is executed positively against the direction of the electrical drive, so that the connection torque in the manual reversing mode is preferably smaller than that in the manual stop mode. Therefore these parameters can be so selected as to satisfy a relation:

$$b > (e=f) > c > d$$

as shown in FIG. 25.

Now reference is made again to the flow chart shown in FIGS. 14A to 14C for explaining the process when the electrical zoom drive is stopped. At step 2006, it is confirmed that the zoom control signal ZC satisfies a relation:

$$(V-\alpha) \geq ZC \geq (V+\alpha)$$

wherein V is the value (center value) of the zoom control signal when the zoom control switch 211 is not operated, and, if this relation is satisfied, there is identified the stopping of the zooming operation and the sequence proceeds to a step 2020.

Also, at step 2013, the zoom control signal is compared with the ZOOM_POS indicating the current zoom position and it is judged whether these two data are mutually equal, and, if equal, there is judged a situation of stopping the zooming operation whereupon the sequence likewise proceeds to the step 2020.

In case, at step 2006 or 2013, it is thus identified the stopping of the zoom drive, a drive signal for stopping the zoom drive is outputted by the CPU 214, then converted into an analog signal by the D/A converter 209 and supplied to the drive circuit 208, which outputs a stop signal to the driving motor 207 based on the supplied signal whereby the driving motor 207 is stopped (step 2020). Then there is confirmed whether any of the four manual mode flags (stop mode flag, reverse mode flag, acceleration mode flag and deleceration mode flag) is "1" (step 2021).

When the zoom drive is terminated, the manual operation may be executed until immediately before the termination of the zoom drive or even be continued at present, and, in the latter case, the electrical drive is terminated in the course of the manual operation. As the connection torque of the clutch 205 is determined for example as Y=a+cX based on the aforementioned minimum connection torque a and X determined from the drive signal, the clutch 205 is connected with such torque during the electrical drive, but the connection torque suddenly decreases to Y=a when the contribution of X is eliminated by the change of the drive signal to zero, whereby the torque of the manual operation suddenly decreases to result in an unpleasant feeling in the manual operation.

In order to prevent such phenomenon, in case any of the manual mode flags is "1", the connection torque Y is decreased stepwisely (step 2022). For example, there is considered a case where, while the clutch 205 is connected with the connection torque Y=a+dX in the manual reverse mode, the operation of the zoom control switch 211 is terminated to reduce the drive signal to zero, thereby stopping the driving motor 207. In such situation, the CPU 214 outputs a connection control signal in such a manner as to decrease the connection torque Y by a predetermined amount β in each cycle of the main routine (Y=Y−β). The stepwise decrease of the connection torque is repeated until it reaches a predetermined connection torque, namely until a relation Y≦Z is met, and, when this relation is confirmed (step 2023), all the manual mode flags are set at 0 whereby the manual mode state is terminated (step 2024). Then the connection torque Y is made 0 (step 2025) whereby the clutch 205 is completely disconnected.

Also in case, at step 2021, it is identified that none of the flags is "1", the CPU 214 outputs such a connection control signal as to immediately bring the connection torque Y to 0, thereby disconnecting the clutch 205.

In the present embodiment, as explained in the foregoing, if the zoom drive ring 201a is manually operated (manual stopping operation, manual accelerating or decelerating operation, or manual reversing operation) in the course of the electrical drive of the zoom lens optical system, the connection torque of the clutch 205 is decreased whereby the drive torque transmitted from the driving motor 207 to the zoom drive ring 201a against the manual operation is reduced (allowing a slippage in the clutch 205 between the side of the manually operated zoom drive ring 201a and the motor 207 side). Therefore, a smooth manual operation is rendered possible while the electrical drive is continued. Also, as the minimum connection torque required in the clutch 205 for enabling the electrical drive is maintained even during the manual operation, the electrical drive of the zoom lens optical system can be re-started by merely leaving the hand from the zoom drive ring 201a.

In the foregoing second embodiment, there has been explained a case where the zoom position detector 202 is composed of a device generating an analog signal such as a potentiometer, but there may also be employed a device generating a pulse signal such as a rotary encoder and the zoom position or the like may be detected by counting the pulse signals from a predetermined reference position.

Also in the foregoing second embodiment, there has been explained a case where the connection torque of the clutch 205 is determined by calculation, but the connection torque may also be determined from table data stored in advance.

Also in the foregoing first and second embodiments, there have been explained cases where a manual operation is executed in the course of the electrical drive of the zoom lens optical system, but the present invention is also applicable to other optical adjusting means such as a focusing lens or a light amount adjusting system.

As explained in the foregoing, the present invention allows to appropriate set the connection torque of the connection means at a magnitude suitable for electrically driving the optical member, thereby preventing the waste in the connection energy (electric power etc.) resulting from an excessively large connection torque of the connection means, or protecting the electrical drive system by the slipping of the connection means in case the optical member becomes immobile by a certain trouble in the course of the electrical drive.

Also according to the present invention, the connection means is automatically shifted to the connected state in response to the input of the instruction signal from the instruction means (drive instruction operation means to be operated for the electrical drive instruction to output an instruction signal or instruction signal generation means for generating and outputting the instruction signal for the automatic optical adjustment) and is automatically shifted to the disconnected state in the absence of the entry of the instruction signal, whereby the electrical drive and the manual drive of the optical adjustment means can be achieved without any particular switching operation.

Also the control of the connection torque of the connection means according to the value of the instruction signal allows to prevent the waste in the connection energy (electric power etc.) resulting from an excessively large setting of the connection torque of the connection means with respect to the operating speed of the electrical drive system, or to facilitate the manual operation in the course of the electrical drive in comparison with the case where the connection means is constantly connected with the maximum connection torque during the electrical drive, or to protect the electrical drive system by the slippage of the connection means in case the optical member becomes immobile by a trouble in the course of the electrical drive.

Also the present invention variably controls the connection torque of the connection means so as to satisfy a relation Tk'<Td'21 Tm wherein Tm is the maximum drive torque generated in the input side member driven by the electrical drive system among the embers constituting the connection means, Tk' is the drive torque required for driving the output side member for driving the optical member, and Td' is the connection torque between the above-mentioned input side member and the above-mentioned output side member, whereby the manual drive can be smoothly executed in the course of the electrical drive by executing the manual operation in such a manner that the manual drive torque Tsy' satisfying a relation Td'<Tsy' is transmitted to the output side member.

Furthermore, as the present invention controls the connection torque of the connection means based on the status of use (for example temperature or posture) of the apparatus or the unit, there can be securely executed the electrical drive regardless of such status of use and there can also be achieved the manual drive smoothly in the course of the electrical drive.

Also according to the present invention, in case the optical member is only manually driven without the electrical drive therefor, the connection torque of the connection means is so controlled as to satisfy a relation $0 \leq Td'' < Tk'$ wherein $Tk'$ is the drive torque required for driving the output side member in the electrical drive for driving the optical member through the manual drive member among the members constituting the connection means, and $Td''$ is the connection torque of the connection means at the manual drive, so that there can be simply added (without addition of a new mechanism) a function, for example, of setting the operation torque required for the manual drive of the optical member according to the taste of the operator.

Furthermore, according to the present invention, in case the manual operation (manual stopping operation, manual accelerating or decelerating operation or manual reversing operation) is executed by manual operation of the zoom drive ring or the like in the course of the electrical drive of the optical member, the drive torque transmitted from the electrical drive system to the optical member against the manual operation is decreased (by allowing a slippage in the connection means between the side of the manually operated optical member and the side of the electrical drive system), whereby the manual operation is enabled smoothly while the electrical drive is continued. Also as the electrical drive state is maintqained (at least with a minimum connection torque required for driving the optical member) even during the manual operation, the electrical drive of the optical member can be re-started by merely releasing the manual operation (for example by leaving the hand from the zoom drive ring).

What is claimed is:

1. An optical apparatus comprising:
    an optical member;
    manual operation means for manually driving said optical member;
    a driving motor for electrically driving said optical member;
    determination means for detecting either a manual drive operation by said manual operation means or an electrical drive operation by said driving motor;
    connection means for transmitting a drive force of said driving motor to said optical member with a predetermined connection torque; and
    control means for setting a value of the predetermined connection torque of said connection means based on a detection result of said determination means;
    wherein when said determination means detects an operation of said manual operation means during an electrical drive operation by said driving motor, said control means varies the value of the predetermined connection torque set in response to the electrical drive operation.

2. An optical apparatus according to claim 1, wherein when said determination means detects the operation of said manual operation means during the electrical drive operation by said driving motor, said control means changes the value of the predetermined connection torque to a value smaller than the value of the predetermined connection torque set in response to the electrical drive operation.

3. An optical apparatus according to claim 1, wherein said connection means is composed of an electromagnet that generates a magnetic force using a current supply, and a magnetic member attracted to said electromagnet by the magnetic force; and
    said control means varies the value of the predetermined connection torque by varying the current supply to said electromagnet.

4. A camera system comprising:
    an optical apparatus comprising:
        an optical member;
        manual operation means for manually driving said optical member;
        a driving motor for electrically driving said optical member;
        determination means for detecting either a manual drive operation by said manual operation means or an electrical drive operation by said driving motor;
        connection means for transmitting a drive force of said driving motor to said optical member with a predetermined connection torque; and
        control means for setting a value of the predetermined connection torque of said connection means based on a detection result of said determination means;
        wherein when said determination means detects an operation of said manual operation means during an electrical drive operation by said driving motor, said control means varies the value of the predetermined connection torque set in response to the electrical drive operation; and
    a camera to which the optical apparatus is mounted.

* * * * *

UNITED STATES PATENT AND TRADEMARK OFFICE
CERTIFICATE OF CORRECTION

PATENT NO.    : 6,574,057 B2
DATED         : June 3, 2003
INVENTOR(S)   : Susumu Fukita et al.

It is certified that error appears in the above-identified patent and that said Letters Patent is hereby corrected as shown below:

<u>Title page,</u>
Item [57], ABSTRACT,
Line 1, "The invention discloses an optical apparatus comprises" should read -- An optical apparatus comprises --.

<u>Column 3,</u>
Line 35, "deetermining" should read -- determining --.

<u>Column 8,</u>
Line 38, "the+side" should read -- the + side --.

<u>Column 12,</u>
Line 46, "contrl" should read -- control --.

<u>Column 13,</u>
Line 33, "te" should read -- the --.

<u>Column 16,</u>
Line 23, "steopped" should read -- stopped --.
Line 52, "RREVERSE_DATA" should read -- REVERSE_DATA --.

<u>Column 24,</u>
Line 17, "appropriate" should read -- appropriately --.
Line 53, "Tk´<Td´21Tm" should read -- Tk´<Td´<Tm --.

<u>Column 25,</u>
Line 30, "maintqained" should read -- maintained --.

Signed and Sealed this

Tenth Day of February, 2004

JON W. DUDAS
*Acting Director of the United States Patent and Trademark Office*